US012196958B2

(12) United States Patent
Ogata

(10) Patent No.: US 12,196,958 B2
(45) Date of Patent: Jan. 14, 2025

(54) IMAGE PROJECTION APPARATUS

(71) Applicant: KOITO MANUFACTURING CO., LTD., Tokyo (JP)

(72) Inventor: Yoichi Ogata, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 18/278,945

(22) PCT Filed: Feb. 9, 2022

(86) PCT No.: PCT/JP2022/005196
§ 371 (c)(1),
(2) Date: Aug. 25, 2023

(87) PCT Pub. No.: WO2022/181346
PCT Pub. Date: Sep. 1, 2022

(65) Prior Publication Data
US 2024/0134190 A1  Apr. 25, 2024
US 2024/0231087 A9  Jul. 11, 2024

(30) Foreign Application Priority Data

Feb. 25, 2021  (JP) ................. 2021-028219
Feb. 25, 2021  (JP) ................. 2021-028221

(51) Int. Cl.
*G02B 27/01*  (2006.01)
*F21V 8/00*  (2006.01)

(52) U.S. Cl.
CPC ....... *G02B 27/0101* (2013.01); *G02B 6/0016* (2013.01); *G02B 6/0035* (2013.01);
(Continued)

(58) Field of Classification Search
CPC ............. G02B 27/0101; G02B 6/0016; G02B 6/0035; G02B 6/0068; G02B 6/0078;
(Continued)

(56) References Cited

U.S. PATENT DOCUMENTS 4,876,680 A * 10/1989 Misawa ................ G11B 7/124
369/112.13
2001/0026399 A1* 10/2001 Nakabayashi ....... G02B 5/1857
359/576
(Continued)

FOREIGN PATENT DOCUMENTS

JP  2010-033026 A  2/2010
JP  2014-063173 A  4/2014
(Continued)

OTHER PUBLICATIONS

International Search Report in corresponding International Application No. PCT/JP2022/005196, dated Apr. 26, 2022 (5 pages).
(Continued)

*Primary Examiner* — Benyam Ketema
(74) *Attorney, Agent, or Firm* — Osha Bergman Watanabe & Burton LLP

(57) ABSTRACT

An image projection apparatus includes a first image irradiation unit, a light guide plate unit, and a diffraction grating unit. The first image irradiation unit is configured to emit first light. The light guide plate unit includes a first light incidence unit, an optical waveguide unit, and a first light emission unit. The first light incidence unit on which the first light is incident. The optical waveguide unit is configured to guide a part of the first light as guided light while totally reflecting the part of the first light. The first light emission unit is configured to emit a part of the guided light in a viewpoint direction. The diffraction grating unit is provided in the first light incidence unit. The first light emission unit includes a beam splitter provided in the optical waveguide
(Continued)

unit and a retroreflection unit provided at an end of the optical waveguide unit.

21 Claims, 33 Drawing Sheets

(52) U.S. Cl.
CPC ......... *G02B 6/0068* (2013.01); *G02B 6/0078* (2013.01); *G02B 6/0088* (2013.01)

(58) Field of Classification Search
CPC ........ G02B 6/0088; G02B 27/02; H04N 5/64; H04N 5/74; H04N 9/31
See application file for complete search history.

(56) References Cited

U.S. PATENT DOCUMENTS

| | | | |
|---|---|---|---|
| 2004/0213133 A1* | 10/2004 | Funato | G11B 7/1353 369/112.05 |
| 2006/0228073 A1* | 10/2006 | Mukawa | G02B 5/18 385/31 |
| 2008/0232762 A1* | 9/2008 | Kuramoto | G02B 1/111 525/123 |
| 2008/0239424 A1 | 10/2008 | Mukawa et al. | |
| 2010/0220295 A1 | 9/2010 | Mukawa et al. | |
| 2011/0211239 A1 | 9/2011 | Mukawa et al. | |
| 2012/0081789 A1 | 4/2012 | Mukawa et al. | |
| 2012/0162549 A1 | 6/2012 | Gao et al. | |
| 2012/0206811 A1 | 8/2012 | Mukawa et al. | |
| 2013/0155513 A1 | 6/2013 | Mukawa et al. | |
| 2014/0003762 A1 | 1/2014 | Macnamara | |
| 2014/0267420 A1 | 9/2014 | Schowengerdt et al. | |
| 2015/0016777 A1* | 1/2015 | Abovitz | G02B 27/0093 385/37 |
| 2015/0178939 A1* | 6/2015 | Bradski | H04N 13/00 345/633 |
| 2015/0205126 A1 | 7/2015 | Schowengerdt | |
| 2015/0234184 A1 | 8/2015 | Schowengerdt et al. | |
| 2015/0247975 A1 | 9/2015 | Abovitz et al. | |
| 2015/0247976 A1 | 9/2015 | Abovitz et al. | |
| 2015/0302662 A1 | 10/2015 | Miller | |
| 2015/0302663 A1 | 10/2015 | Miller | |
| 2015/0302665 A1 | 10/2015 | Miller | |
| 2015/0309263 A2 | 10/2015 | Abovitz et al. | |
| 2015/0309264 A1* | 10/2015 | Abovitz | G02B 6/32 385/33 |
| 2015/0355467 A1 | 12/2015 | Mukawa et al. | |
| 2016/0109705 A1 | 4/2016 | Schowengerdt | |
| 2016/0109706 A1 | 4/2016 | Schowengerdt et al. | |
| 2016/0110912 A1 | 4/2016 | Schowengerdt | |
| 2016/0154245 A1 | 6/2016 | Gao et al. | |
| 2016/0170215 A1 | 6/2016 | Mukawa et al. | |
| 2017/0205618 A1* | 7/2017 | Basset | G02B 23/26 |
| 2019/0056593 A1* | 2/2019 | Bablumyan | G02B 27/44 |
| 2019/0293838 A1* | 9/2019 | Haba | G02B 27/14 |
| 2020/0339147 A1* | 10/2020 | Hayakawa | B60K 35/00 |
| 2022/0252900 A1* | 8/2022 | Ogata | G02B 27/106 |
| 2023/0014232 A1* | 1/2023 | Ogata | H04N 13/346 |
| 2023/0314671 A1* | 10/2023 | Ogata | G02B 5/1814 359/566 |

FOREIGN PATENT DOCUMENTS

| | | | | |
|---|---|---|---|---|
| JP | 2018-028703 A | | 2/2018 | |
| JP | 2019-119262 A | | 7/2019 | |
| JP | 2020-144190 A | | 9/2020 | |
| WO | WO2020/246516 | * | 10/2020 | ............ G02B 30/56 |
| WO | 2020-246516 A1 | | 12/2020 | |

OTHER PUBLICATIONS

Written Opinion in corresponding International Application No. PCT/JP2022/005196, dated Apr. 26, 2022 (4 pages).

* cited by examiner

With room light        Without room light

IMAGE PROJECTION APPARATUS

TECHNICAL FIELD

The present disclosure relates to an image projection apparatus, particularly to an image projection apparatus using a diffraction grating.

BACKGROUND ART

In the related art, a dashboard that displays icons by lighting is used as a device for displaying various kinds of information in a vehicle. Along with an increase in the amount of information to be displayed, it has also been proposed to embed an image display device in a dashboard or to constitute the entire dashboard with an image display device.

Since the dashboard is located below a windshield of the vehicle, it is necessary for a driver to move a line of sight downward during driving in order to view information displayed on the dashboard, which is not preferable. Therefore, a head-up display (hereinafter referred to as HUD: Head Up Display) has been proposed that projects an image onto the windshield so that the driver can read information when viewing the front of the vehicle (for example, see Patent Literature 1). In such a HUD, an optical device for projecting an image onto a wide range of a windshield is required, and it is desired to reduce the size and weight of the optical device.

As an image display device that projects light using a small optical device, a wearable HUD is known in which light is incident from one end of a light guide plate and light is extracted in a viewpoint direction from the other end of the light guide plate (for example, see Patent Literature 2). With the wearable HUD, light emitted from a light source is directly applied to an eye of a viewer to project an image on a retina of the viewer. In such a wearable HUD, a diffraction grating or a half mirror is used when the viewer is irradiated with light from a light source. The wearable HUD projects an image from a viewpoint of an individual user by being worn on a head, and thus is used for virtual reality (VR), augmented reality (AR), or the like having a high sense of immersion.

CITATION LIST

Patent Literature

Patent Literature 1: JP2019-119262A
Patent Literature 2: JP2020-144190A

SUMMARY OF INVENTION

Technical Problem

In the wearable HUD in the related art, since an image is projected from a light guide plate in a viewpoint direction by a diffraction grating or a half mirror, all images are displayed in a plane having the same distance from the viewpoint. Therefore, it is difficult to display and superimpose a plurality of images at different distances from the viewpoint. In order to project a plurality of images at positions having different distances from the viewpoint, it is necessary to design and individually arrange an image projection unit and an optical system member corresponding to a projection position, and thus there is a problem that the number of parts increases, making it difficult to reduce the size and weight of a device.

In addition, in the wearable HUD in the related art, in order to perform colorful image projection by emitting light with a plurality of wavelengths, it is necessary to use a plurality of light sources and optical members suitable for respective wavelengths, and thus there is a problem that the number of parts of the optical members increases. In a case where image projection is performed by superimposing light with a plurality of wavelengths, there is a problem that it is difficult to adjust an optical axis of an optical member.

Therefore, an object of the present disclosure is to provide a compact and lightweight image projection apparatus that projects a plurality of images at positions having different distances from a viewpoint.

Another object of the present disclosure is to provide an image projection apparatus that simplifies an optical member necessary for performing image projection using light with a plurality of wavelengths and reduces the size and weight of the optical member.

Solution to Problem

An image projection apparatus according to the present disclosure includes:
  a first image irradiation unit configured to emit first light;
  a light guide plate unit including a first light incidence unit
    on which the first light is incident, an optical waveguide
    unit configured to guide a part of the first light as
    guided light while totally reflecting the part of the first
    light, and a first light emission unit configured to emit
    a part of the guided light in a viewpoint direction; and
  a diffraction grating unit provided in the first light incidence unit, in which
  the first light emission unit includes a beam splitter
    provided in the optical waveguide unit and a retroreflection unit provided at an end of the optical waveguide unit.

In such an image projection apparatus, the first light is split by the beam splitter to project an image onto a screen, and the first light is retroreflected by the retroreflection unit at the end of the optical waveguide unit and is projected in the viewpoint direction by the beam splitter to form an aerial image. Accordingly, it is possible to project a plurality of images at positions having different distances from the viewpoint, and further reduce the size and weight of the image projection apparatus.

In addition, an image projection apparatus according to the present disclosure includes:
  a third image irradiation unit configured to emit first light;
  a fourth image irradiation unit configured to emit second light;
  a light guide plate unit including a third light incidence unit on which the first light and the second light are incident, an optical waveguide unit configured to guide a part of the first light and a part of the second light as first guided light and second guided light, respectively, and a third light emission unit configured to emit the first guided light and the second guided light; and
  a first diffraction grating unit provided in the third light incidence unit, in which
  incident angles of the first light and the second light with respect to the first diffraction grating unit are different from each other, and a part of the first light and a part of the second light diffracted by the first diffraction grating unit satisfy a total reflection condition of the optical waveguide unit.

In such an image projection apparatus, the first light and the second light are incident at different incident angles with respect to the first diffraction grating unit, and the first light and the second light are totally reflected by the optical waveguide unit and guided to the third light emission unit, and thus it is possible to simplify an optical member and reduce the size and weight of the optical member.

Advantageous Effects of Invention

According to the present disclosure, it is possible to provide a compact and lightweight image projection apparatus that projects a plurality of images at positions having different distances from a viewpoint.

Further, according to the present disclosure, it is possible to provide an image projection apparatus that simplifies an optical member necessary for performing image projection using light with a plurality of wavelengths and reduces the size and weight of the optical member.

DESCRIPTION OF EMBODIMENTS

Embodiment 1

Figure 1:
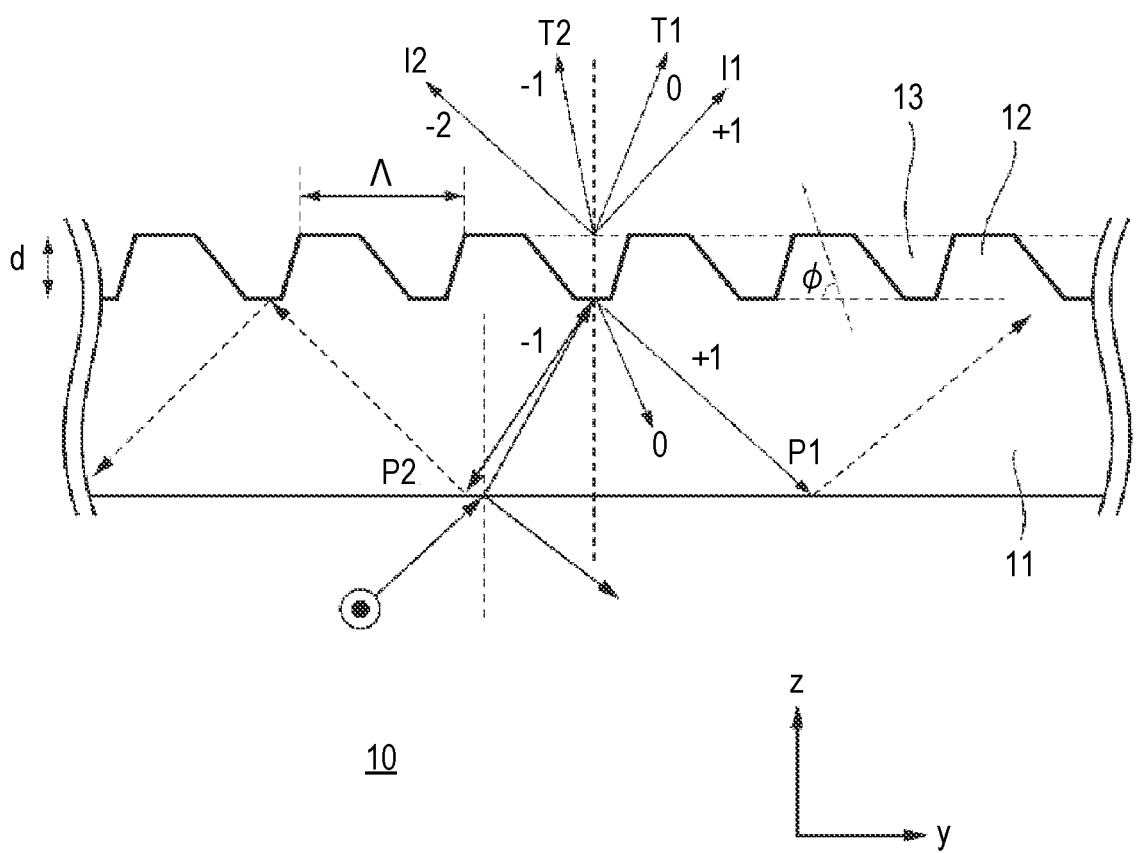
FIG. 1 is a schematic cross-sectional view showing a structure of a diffraction grating unit 10 according to Embodiment 1.

Hereinafter, embodiments of the present disclosure will be described in detail with reference to the drawings. The same or equivalent components, members, and processes shown in the drawings are denoted by the same reference numerals, and redundant description thereof will be omitted as appropriate. FIG. 1 is a schematic cross-sectional view showing a structure of a diffraction grating unit 10 according to the present embodiment. As shown in FIG. 1, the diffraction grating unit 10 includes a flat-plate portion 11, a plurality of convex portions 12, and a plurality of concave portions 13. The flat-plate portion 11 constitutes a light incident surface. The convex portions 12 and the concave portions 13 constitute periodic repetitions of a refractive index in an in-plane direction in the diffraction grating unit 10, and correspond to an uneven portion in the present disclosure. The flat-plate portion 11 and the convex portions 12 are integrally formed of the same material. FIG. 1 schematically shows the structure of the diffraction grating unit 10, and the dimensions and angles in the drawing do not show the actual dimensions of the diffraction grating unit 10.

In the example shown in FIG. 1, the convex portions 12 and the concave portions 13 of the diffraction grating unit 10 are each formed to extend in a stripe shape in a depth direction of a paper surface. The convex portions 12 each are formed so as to be inclined by a predetermined angle φ with respect to a main surface of the flat-plate portion 11, and constitute a slanted grating. The convex portions 12 and the concave portions 13 are covered with a covering portion made of a material having a refractive index different from that of the flat-plate portion 11. The material forming the diffraction grating unit 10 is not limited, but as an example, a dielectric having a refractive index of about 2.5 containing $TiO_2$ as a main component may be used as the material forming the flat-plate portion 11 and the convex portions 12. Glass or a polymer containing $SiO_2$ as a main component may be used as the covering portion that covers the convex portions 12 and the concave portions 13.

The uneven portion of the diffraction grating unit 10 can be formed by, for example, photolithography technology, nanoimprint technology, electron beam lithography (EBL) technology, or the like. In addition, the convex portion 12 and the concave portion 13 can be formed to be inclined by the angle φ by using a reactive ion etching (RIE) method or the like while holding the covering portion in an inclined state. At this time, the inclination angle φ of the convex portion 12 and the concave portion 13 is an angle formed between a line connecting centers of an upper end and a lower end of the convex portion 12 and the main surface of the diffraction grating unit 10. In FIG. 1, the slanted grating in which the convex portions 12 and the concave portions 13 are inclined is shown as the uneven portion of the diffraction grating unit 10, but a pillared grating perpendicular to the main surface may be used as the uneven portion of the diffraction grating unit 10.

Next, a light path in the diffraction grating unit 10 will be described with reference to FIG. 1. FIG. 1 schematically shows propagation of light in the diffraction grating unit 10 using arrows, but does not reflect an accurate incident position, propagation path, and emission position of light. A light source unit (not shown) emits a laser beam toward the diffraction grating unit 10. The laser beam is coherent light having the same phase, and is emitted as collimated light by a collimating lens or the like. Incident light emitted from the light source unit enters the flat-plate portion 11 at a predetermined inclination angle from an interface of the diffraction grating unit 10.

A polarization direction of the incident light is parallel to a stripe of the convex portion 12. In FIG. 1, the inclination angle of the incident light and the inclination direction φ of the convex portion 12 and the concave portion 13 in the diffraction grating unit 10 are the same direction, but may be opposite directions. A part of the light incident on the diffraction grating unit 10 travels outward at a predetermined angle as diffracted light due to a periodic refractive index difference between the convex portions 12 and the concave portions 13, and a part of the light propagates through a plane of the flat-plate portion 11 as leak-propagating light. The leak-propagating light propagated through the flat-plate portion 11 is reflected at an interface with the air, reaches the uneven portion again, and is diffracted by the convex portion 12 and the concave portion 13.

In the example shown in FIG. 1, among the light diffracted by the diffraction grating unit 10, 0th-order light T1 passes through the covering portion and is emitted to the outside. In addition, first-order light (−1st-order light T2) diffracted in a direction in which the convex portion 12 is inclined passes through the covering portion and is emitted to the outside. This is because the 0th-order light T1 and the −1st-order light T2 are diffracted at an angle nearly perpendicular to the main surface of the diffraction grating unit 10, and thus a total reflection condition on an interface between the covering portion and an air layer is not satisfied.

First-order light (+1st-order light I1) diffracted in a direction opposite to the inclination of the convex portion 12 is totally reflected by the interface between the covering portion and the air layer and propagates through the covering portion. Similarly, second-order light (−2nd-order light I2) diffracted in the inclined direction of the convex portion 12 is also totally reflected by the interface between the covering portion and the air layer and propagates through the covering portion. The total reflection condition at the interface between the covering portion and the air layer is determined by a refractive index of a material constituting the covering portion. The +1st-order light I1 and the −2nd-order light I2 that are totally reflected and propagated through the covering portion are emitted to the outside from an end of the covering portion. At this time, the 0th-order light T1, the −1st-order light T2, the +1st-order light I1, and the −2nd-order light I2 are light diffracted by the convex portion 12 and the concave portion 13, and thus travel while slightly expanding light diameters.

Figure 2:
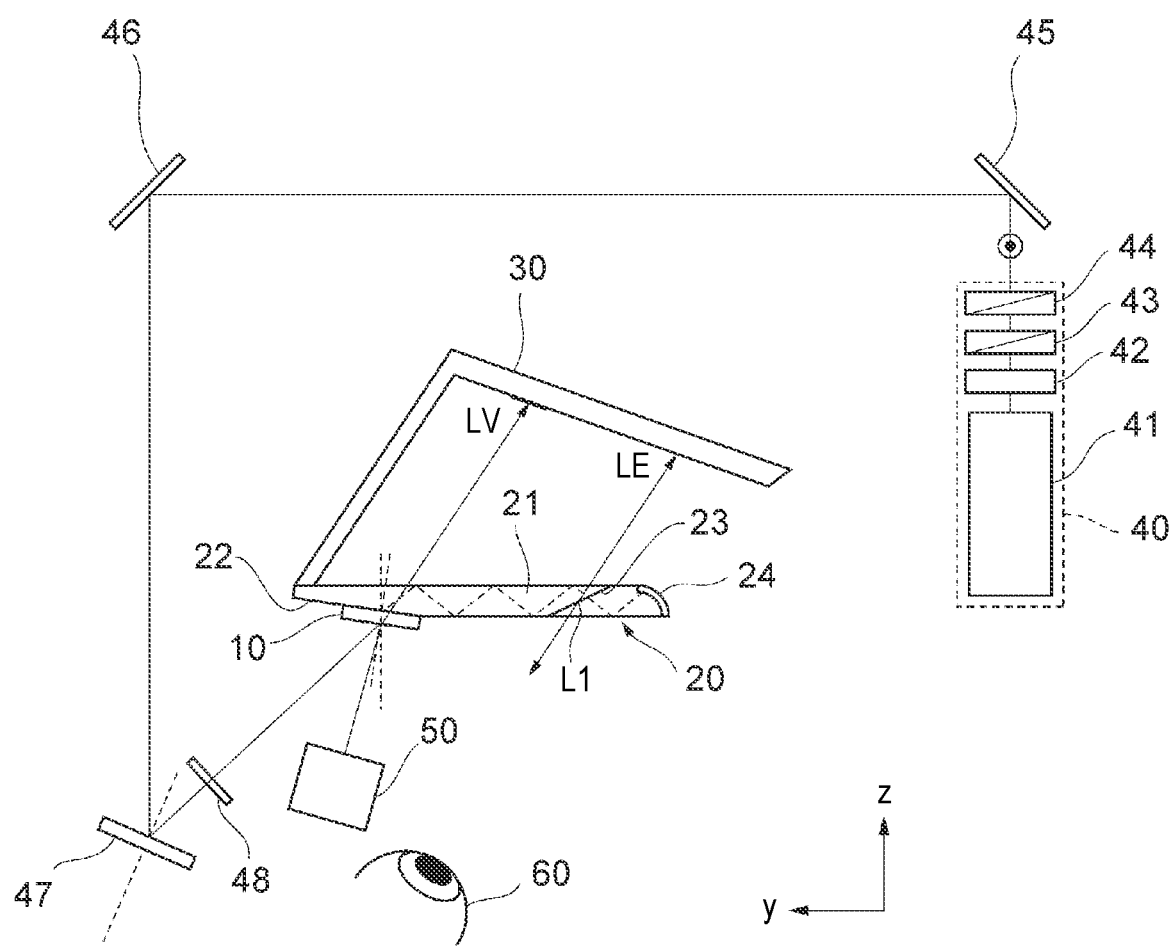
FIG. 2 is a schematic diagram showing a structure of an image projection apparatus according to Embodiment 1.

FIG. 2 is a schematic diagram showing a structure of an image projection apparatus according to the present embodiment. As shown in FIG. 2, the image projection apparatus includes the diffraction grating unit 10, a light guide plate unit 20, an external screen 30, and image irradiation units 40 and 50. A viewer wearing the image projection apparatus views the light guide plate unit 20 and a direction of the external screen 30 from a position of a viewpoint 60. As shown in FIG. 1, the diffraction grating unit 10 is an optical element including the flat-plate portion 11, the convex portions 12, the concave portions 13, and the covering portion, and is formed separately from the light guide plate unit 20. The light guide plate unit 20 is a plate-shaped member made of a translucent material, and includes an optical waveguide unit 21, a light incidence unit 22, a beam splitter 23, and a retroreflection unit 24.

The optical waveguide unit 21 is a flat plate-shaped member made of a translucent material, and guides light from one end side to the other end side by repeating total reflection of light at an interface with air. Since the light is transmitted from one surface side to the other surface side in the optical waveguide unit 21, the viewer can view the direction of the external screen 30 from the viewpoint 60 through the optical waveguide unit 21. On one end side of the optical waveguide unit 21, the light incidence unit 22 which is a surface inclined with respect to the main surface is formed, and the diffraction grating unit 10 is arranged. On the other end side of the optical waveguide unit 21, an end surface is formed and the retroreflection unit 24 is provided. In FIG. 2, the optical waveguide unit 21 has a flat plate shape, but the optical waveguide unit 21 may have a curved shape as long as the light can be propagated through the optical waveguide unit 21 by total reflection.

The light incidence unit 22 is an inclined surface formed at one end of the optical waveguide unit 21, is arranged adjacent to the diffraction grating unit 10, and corresponds to a first light incidence unit in the present disclosure. The light incidence unit 22 may be provided with an antireflection film or a refractive index adjustment unit in order to increase an optical coupling ratio with the diffraction grating unit 10.

The beam splitter 23 is an optical element that reflects a part of light incident from one surface and transmits a remaining part of the light, and is formed as a plane inclined with respect to the main surface inside the optical waveguide unit 21 in the example shown in FIG. 2. A specific configuration of the beam splitter 23 is not limited, and a normal structure and design method can be used.

The retroreflection unit 24 is an optical member that reflects incident light with respect to an incident direction while maintaining light condensing properties, and may have a structure in which minute glass beads are spread over a surface of a reflective film or a structure using a prism. In the retroreflection unit 24, when the light propagated through the optical waveguide unit 21 is incident, the light is reflected in a direction in which the light is incident. Therefore, light traveling with an increased light diameter is reflected as light with a decreased light diameter.

As will be described later, a region from a position where the beam splitter 23 is provided to a position where the retroreflection unit 24 is provided in the optical waveguide unit 21 is a region where the light propagated through the optical waveguide unit 21 is emitted to the outside, and constitutes a first light emission unit in the present disclosure.

The external screen 30 displays an image by projecting the light emitted from the light guide plate unit 20, as described below. A material constituting the external screen 30 is not limited, and a translucent material that transmits light may be used, or a white material that blocks and reflects light may be used. In a case where a translucent material is used, images can be projected in a superimposed manner with an external environment of the image projection apparatus as a background. In the example shown in FIG. 2, the external screen 30 and an arm portion are integrally formed, and the arm portion is fixed to the light guide plate unit 20, thereby maintaining a relative positional relationship between the external screen 30 and the light guide plate unit 20. However, the external screen 30 may be provided separately from the image projection apparatus.

The image irradiation unit 40 is a device that irradiates the diffraction grating unit 10 with first light for projecting a first image, and corresponds to a first image irradiation unit in the present disclosure. A specific configuration of the image irradiation unit 40 is not limited, but in the example shown in FIG. 2, the image irradiation unit 40 includes a light source unit 41, a half-wavelength plate 42, and polarizers 43 and 44. The image irradiation unit 40 irradiates the diffraction grating unit 10 with light through mirrors 45, 46, and 47 and a band-pass filter 48. A laser light source is preferably used as the light source unit 41, and a laser beam emitted from the light source unit 41 is emitted to an image forming unit (not shown) to include the first image in the first light. A liquid crystal display element, a digital mirror device, or the like can be used as the image forming unit, and the image forming unit may be provided inside the image irradiation unit 40, or may be arranged on an optical path to the diffraction grating unit 10. When the image irradiation unit 40 includes a liquid crystal display element or a digital mirror device as the image forming unit, it is also possible to project a moving image by changing a content of the first image included in the first light over time.

An image irradiation unit 50 is a device that irradiates the diffraction grating unit 10 with second light for projecting a second image, and corresponds to a second image irradiation unit in the present disclosure. The image irradiation unit 50 is provided separately from the image irradiation unit 40, and an incident angle of the second light with respect to the diffraction grating unit 10 is different from an incident angle of the first light emitted by the image irradiation unit 40. A specific configuration of the image irradiation unit 50 is not limited, and a configuration similar to that of the image irradiation unit 40 can be used, but wavelengths of the first light and the second light are different.

Figure 3:
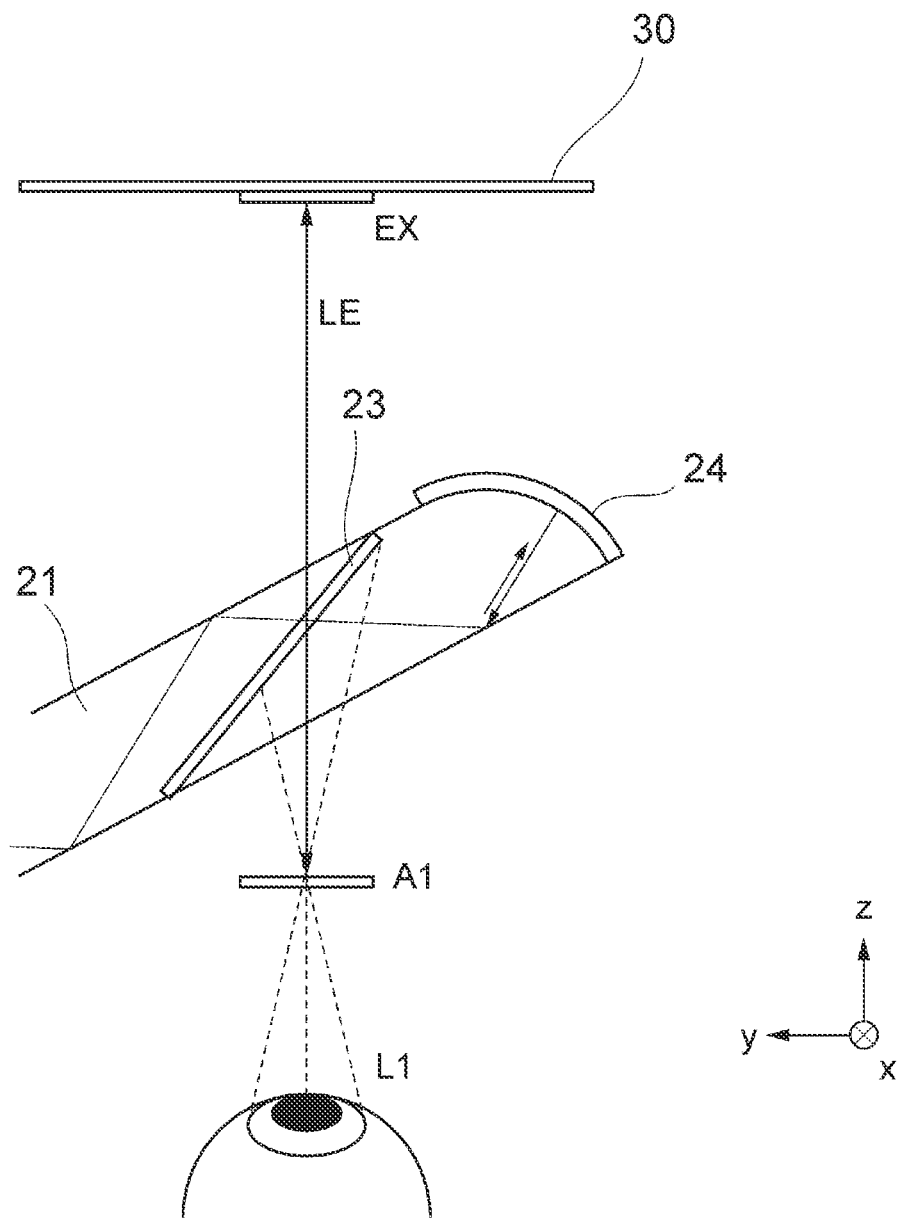
FIG. 3 is an enlarged schematic cross-sectional view showing a first light emission unit of the image projection apparatus according to Embodiment 1.

Next, image projection in the image projection apparatus of the present embodiment will be described with reference to FIGS. 2 and 3. FIG. 3 is an enlarged schematic cross-sectional view showing a first light emission unit of the image projection apparatus according to the present embodiment. Solid-line arrows and dashed-line arrows shown in the FIG. schematically indicate paths of light.

The first light emitted from the image irradiation unit 40 is reflected by the mirrors 45, 46, and 47 and reaches the diffraction grating unit 10 via the band-pass filter 48. In the diffraction grating unit 10, the 0th-order light T1 and the +1st-order light I1 are extracted as diffracted light according to the incident angle of the first light, and are incident on the light incidence unit 22. The first light entering the light incidence unit 22 from the diffraction grating unit 10 is totally reflected in the optical waveguide unit 21 and propagates as guided light. The incident angle of the first light incident on the light incidence unit 22 from the diffraction grating unit 10 is determined by diffraction conditions. Therefore, an inclination angle of the light incidence unit 22 is set so that any one of the 0th-order light T1, the −1st-order light T2, the +1st-order light I1, and the −2nd-order light 12 satisfies the total reflection condition on both surfaces of the optical waveguide unit 21.

A part of the first light propagated as guided light while being totally reflected in the optical waveguide unit 21 is reflected by one surface of the beam splitter 23, and the remaining light is transmitted through the beam splitter 23. The guided light reflected by the beam splitter 23 is extracted as irradiation light LE in the direction of the external screen 30, and an image EX is projected on the external screen 30. By designing reflectance on the one surface of the beam splitter 23 to be low, it is also possible to reduce an intensity of the irradiation light LE and make the image EX invisible.

Further, the guided light transmitted through the beam splitter 23 is totally reflected again by the optical waveguide unit 21, reaches the retroreflection unit 24, and is retroreflected. The guided light retroreflected by the retroreflection unit 24 travels in an opposite direction in the optical waveguide unit 21, reaches the beam splitter 23 after being totally reflected, is reflected, and is extracted in the direction of the viewpoint 60 as imaging light L1. At this time, the guided light propagated through the optical waveguide unit 21 has an increased optical diameter, but the guided light reflected by the retroreflection unit 24 travels with a decreased optical diameter. In the examples shown in FIGS. 2 and 3, since a reflection surface of the retroreflection unit 24 has a concave shape, the guided light reaches the beam splitter 23 while the light diameter is further reduced.

Therefore, the imaging light L1 reflected by the beam splitter 23 and traveling in the direction of the viewpoint 60 is focused at a predetermined position, and thus an aerial image A1 is formed in the air. In a case where the retroreflection unit 24 is formed with a flat surface, an optical path length from the diffraction grating unit 10 to the retroreflection unit 24 is the same as an optical path length from the retroreflection unit 24 to the aerial image A1. After the aerial image A1 is formed, the imaging light L1 is incident on the viewpoint 60 while the light diameter is increased. Accordingly, the viewer can simultaneously view the aerial image A1 formed in the air and the image EX projected on the external screen 30 when viewing the optical waveguide unit 21 and the direction of the external screen 30 from the viewpoint 60.

In FIGS. 2 and 3, the other end of the optical waveguide unit 21 is formed in a convex shape and the retroreflection unit 24 is formed in a concave shape. However, the other end may be formed in a flat plate shape or a concave shape, and the retroreflection unit 24 may be formed in a flat plate shape or a convex shape. By appropriately designing the shape and the curvature of the retroreflection unit 24, it is possible to adjust a reduction ratio of the light diameter retroreflected by the retroreflection unit 24, and finely adjust a position where the aerial image A1 is formed by the imaging light being reflected by the beam splitter 23.

Further, the guided light propagated through the optical waveguide unit 21 needs to be totally reflected at the interface with air at least once before reaching the retroreflection unit 24 from the beam splitter 23. It is preferable to select the number of times of total reflection at the interface to be even or odd depending on an optical design. By ensuring a distance between the beam splitter 23 and the retroreflection unit 24 to such an extent that the light is totally reflected, it is possible to prevent the retroreflection unit 24 from being located near a center of a field of view when the direction of the external screen 30 is viewed from the viewpoint 60 via the beam splitter 23. In addition, since the retroreflection unit 24 is visible without transmitting light, it is not preferable for the retroreflection unit 24 to be located in the center of the field of view because the visibility of the aerial image A1 is reduced.

Of the first light diffracted and split by the diffraction grating unit 10, light that does not satisfy the total reflection condition on both surfaces of the optical waveguide unit 21 is extracted as irradiation light LV to the outside from the surface of the optical waveguide unit 21 on the side of the external screen 30. A region of the optical waveguide unit 21 from which the irradiation light LV is extracted corresponds to a second light emission unit in the present disclosure. The irradiation light LV extracted from the second light emission unit reaches the external screen 30 and projects an image V1 (not shown).

In the example shown in FIG. 2, a viewpoint direction which is a traveling direction of the imaging light L1 and an external screen direction which is a traveling direction of the irradiation light LV are substantially parallel to each other. Accordingly, even when a distance between the external screen 30 and the optical waveguide unit 21 is changed, a projection position of the image V1 on the external screen 30 is not changed. Therefore, when the viewer views the direction of the external screen 30 from the viewpoint 60, a position where the aerial image A1 is formed and a position where the image V1 is projected do not overlap each other, and the viewer can view the aerial image A1 and the image V1 side by side within the same field of view. Here, an example in which the viewpoint direction and the external screen direction are parallel to each other is shown, but the viewpoint direction and the direction of the external screen may intersect with each other at a predetermined angle. By appropriately setting the distance between the external screen 30 and the optical waveguide unit 21, the projection position of the image V1 on the external screen 30 can be adjusted. Therefore, a positional relationship between the aerial image A1 and the image V1 can be adjusted and viewed from the viewpoint 60.

When a part of the light diffracted by the diffraction grating unit 10 satisfies the total reflection condition in the optical waveguide unit 21, the second light emitted from the image irradiation unit 50 can also project the image EX and form the aerial image A1 in the same manner as the first light. Of the second light diffracted by the diffraction grating unit 10, light that does not satisfy the total reflection condition in the optical waveguide unit 21 can also project the image V1. All the second light diffracted by the diffraction grating unit 10 may not satisfy the total reflection condition in the optical waveguide unit 21, and only the image V1 may be projected onto the external screen 30 with the second light. Alternatively, the second light emitted from the image irradiation unit 50 may not be incident on the diffraction grating unit 10, and may be incident on a surface of the optical waveguide unit 21 facing the viewpoint 60 to directly project the image V1 onto the external screen 30. In this case, a region through which the irradiation light LV projecting the image V1 is transmitted corresponds to the second light emission unit in the optical waveguide unit 21.

Figure 4A:
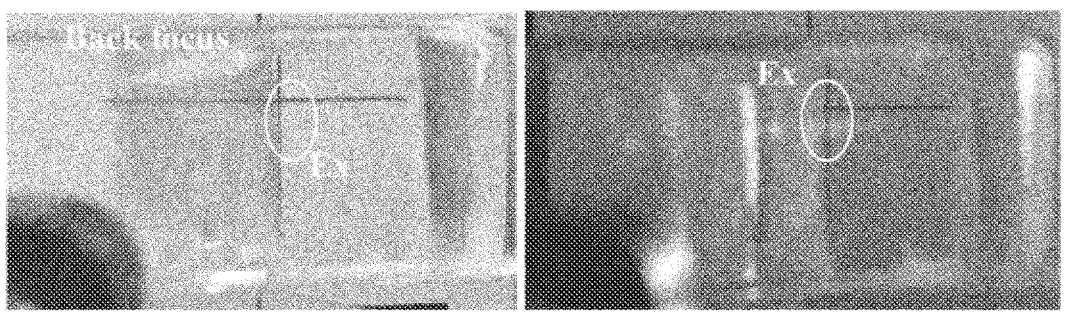
FIG. 4A is a photograph obtained by capturing an image EX projected on an external screen 30 and an aerial image A1 formed in the air with a camera installed at a position of a viewpoint 60, and is a photograph in which the camera is focused on the external screen 30.
Figure 4B:
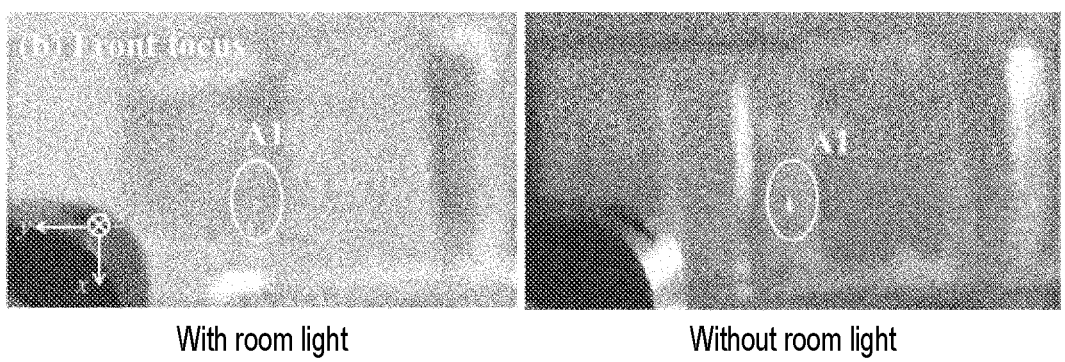
FIG. 4B is a photograph obtained by capturing the image EX projected on the external screen 30 and the aerial image A1 formed in the air with the camera installed at the position of the viewpoint 60, and is a photograph in which the camera is focused on an imaging position of the aerial image A1.

FIGS. 4A, 4B, 4C, and 4D are photographs obtained by capturing the image EX projected on the external screen 30 and the aerial image A1 formed in the air with a camera installed at a position of the viewpoint 60. FIG. 4A is a photograph in which the camera is focused on the external screen 30, and FIG. 4B is a photograph in which the camera is focused on an imaging position of the aerial image A1. In FIGS. 4A and 4B, a photograph on the left side shows an appearance in a bright state in which a room light is turned on, and a photograph on the right side shows an appearance in a dark state in which the room light is turned off. The image EX and the aerial image A1 are captured at positions indicated by ellipses of white lines in the photographs. As shown in FIG. 4A, the image EX is difficult to view in a bright environment and is visible in a dark environment. As shown in FIG. 4B, the aerial image A1 is visible in both the bright environment and the dark environment. Further, the aerial image A1 and the image EX can be viewed close to each other in the same field of view, and the viewer can select a target to be viewed only by adjusting a focal length of vision.

As described above, in the image projection apparatus of the present embodiment, the first light is split by the beam splitter 23 to project the image EX onto the external screen 30, and the first light is retroreflected by the retroreflection unit 24 at an end of the optical waveguide unit 21, and is reflected in the viewpoint direction by the beam splitter 23 to form the aerial image A1. Accordingly, it is possible to project and view a plurality of images at positions having different distances from the viewpoint. Further, the diffraction grating unit 10 is provided in the light incidence unit 22 of the light guide plate unit 20, and the beam splitter 23 and the retroreflection unit 24 are provided to constitute the first light emission unit. Therefore, a complicated optical design and an increase in the number of parts are not required, and it is possible to reduce the size and weight.

Embodiment 2

Figure 5:
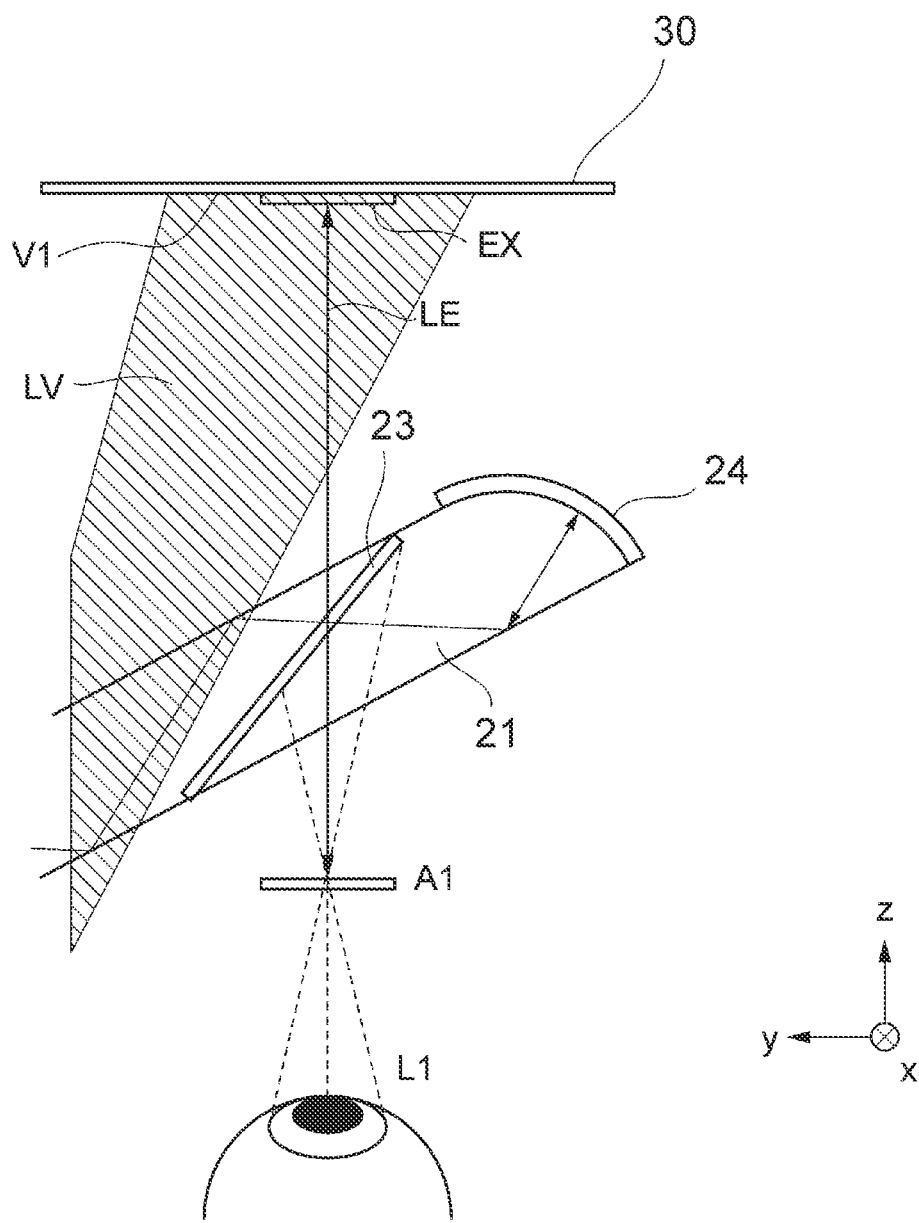
FIG. 5 is an enlarged schematic cross-sectional view showing a first light emission unit of an image projection apparatus according to Embodiment 2.

Next, Embodiment 2 of the present disclosure will be described with reference to FIGS. 5, 6A and 6B. Description of contents overlapping with Embodiment 1 will be omitted. FIG. 5 is an enlarged schematic cross-sectional view showing a first light emission unit of an image projection apparatus according to the present embodiment. Solid-line arrows and dashed-line arrows shown in FIG. 5 schematically indicate paths of light. In FIG. 5, a region hatched with diagonal lines indicates a region irradiated with the irradiation light LV. The image projection apparatus of the present embodiment is different from Embodiment 1 only in the projection position of the image V1, and other configurations are the same as those described in Embodiment 1 with reference to FIG. 1. In the present embodiment, the second light emitted from the image irradiation unit 50 is used as the irradiation light LV, and the image EX and the image V1 are projected onto the same region by intersecting the external screen direction, which is the traveling direction of the irradiation light LV, with the viewpoint direction.

As shown in FIG. 5, the light that is totally reflected and propagates inside the optical waveguide unit 21 is split by the beam splitter 23 to project the image EX onto the external screen 30 as the irradiation light LE. In addition, the light transmitted through the beam splitter 23 is totally reflected again by the optical waveguide unit 21 to reach the retroreflection unit 24, and forms the aerial image A1 as the imaging light L1 reflected by the beam splitter 23 after being retroreflected.

The traveling direction of the irradiation light LV projected from the second light emission unit onto the external screen 30 is a direction intersecting the viewpoint direction which is the traveling direction of the imaging light L1. In the example shown in FIG. 5, the second light emitted from the image irradiation unit 50 is not incident on the diffraction grating unit 10 and is directly emitted as the irradiation light LV to the external screen 30 via the optical waveguide unit 21, and the image V1 is projected on the external screen 30.

Figure 6A:
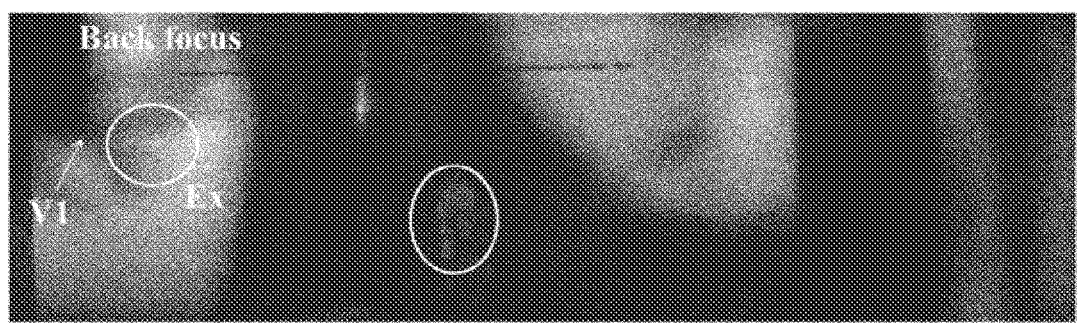
FIG. 6A is a photograph obtained by capturing an image EX and an image V1 projected on an external screen 30 and an aerial image A1 formed in the air with a camera installed at a position of a viewpoint 60, and is a photograph in which the camera is focused on the external screen 30.
Figure 6B:
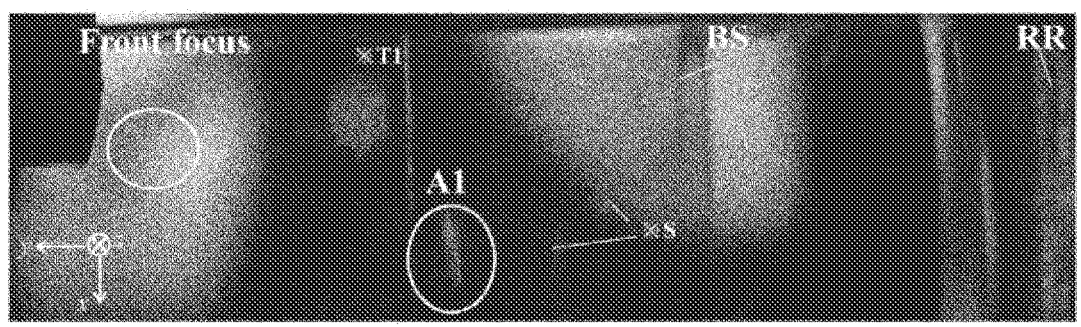
FIG. 6B is a photograph obtained by capturing the image EX and the image V1 projected on the external screen 30 and the aerial image A1 formed in the air with the camera installed at the position of the viewpoint 60, and is a photograph in which the camera is focused on an imaging position of the aerial image A1.

FIGS. 6A and 6B are photographs obtained by capturing the image EX and the image V1 projected on the external screen 30 and the aerial image A1 formed in the air with the camera installed at the position of the viewpoint 60. FIG. 6A is a photograph in which the camera is focused on the external screen 30, and FIG. 6B is a photograph in which the camera is focused on an imaging position of the aerial image A1. The image EX and the aerial image A1 are captured at positions indicated by ellipses of white lines in the photographs, and the image V1 is captured in a range larger than the image EX. As shown in FIG. 6A, the image EX is superimposed on the image V1 and displayed, and both images can be viewed simultaneously. Further, the viewer can select a target to be viewed only by adjusting a focal length of vision.

In the present embodiment, since the image V1 is projected on a wide range of the external screen 30 using the second light as the irradiation light LV, it is possible to perform image projection in which the aerial image A1 is superimposed on the image V1 as a background image. In addition, by projecting the image EX on the external screen 30, projection positions of the image V1 and the image EX, which are background images, have the same distance from the viewpoint 60, and the viewer can simultaneously view the two different images V1 and A1 and the image EX.

Embodiment 3

Figure 7:
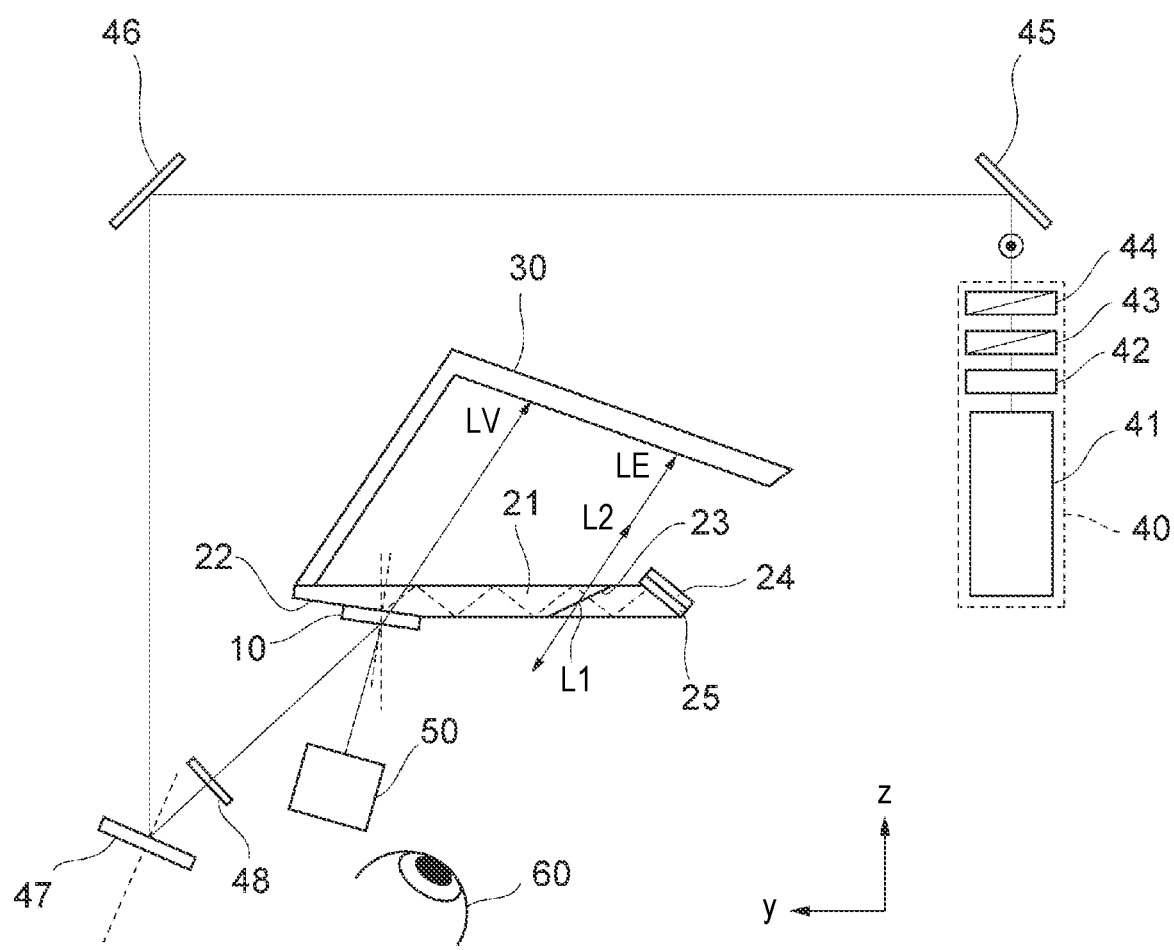
FIG. 7 is a schematic diagram showing a structure of an image projection apparatus according to Embodiment 3.

Next, Embodiment 3 of the present disclosure will be described with reference to FIGS. 7 to 10E. Description of contents overlapping with Embodiment 1 will be omitted. The present embodiment is different from Embodiment 1 in that a partial reflection unit that reflects a part of guided light at predetermined reflectance and transmits a remaining part of the guided light is provided between the beam splitter 23 and the retroreflection unit 24 constituting the first light emission unit. FIG. 7 is a schematic diagram showing a structure of an image projection apparatus according to the present embodiment.

As shown in FIG. 7, the image projection apparatus includes the diffraction grating unit 10, the light guide plate unit 20, the external screen 30, and the image irradiation units 40 and 50. A viewer wearing the image projection apparatus views the light guide plate unit 20 and a direction of the external screen 30 from a position of a viewpoint 60. As shown in FIG. 1, the diffraction grating unit 10 is an optical element including the flat-plate portion 11, the convex portions 12, the concave portions 13, and the covering portion, and is formed separately from the light guide plate unit 20. The light guide plate unit 20 is a plate-shaped member made of a translucent material, and includes the optical waveguide unit 21, the light incidence unit 22, the beam splitter 23, the retroreflection unit 24, and a partial reflection unit 25.

The partial reflection unit 25 is an optical element that reflects a part of light at predetermined reflectance and transmits a remaining part of the light, and is provided on an optical path between the beam splitter 23 and the retroreflection unit 24. In the example shown in FIG. 7, the partial reflection unit 25 is formed between the end of the optical waveguide unit 21 and the retroreflection unit 24. In FIG. 7, the end of the optical waveguide unit 21, the retroreflection unit 24, and the partial reflection unit 25 are formed in a flat shape, but may have a convex shape and a concave mirror, or may have a concave shape and a convex mirror as in Embodiment 1. Alternatively, a combination of three-dimensional parabolic concavo-convex shapes may be used.

Figure 8:
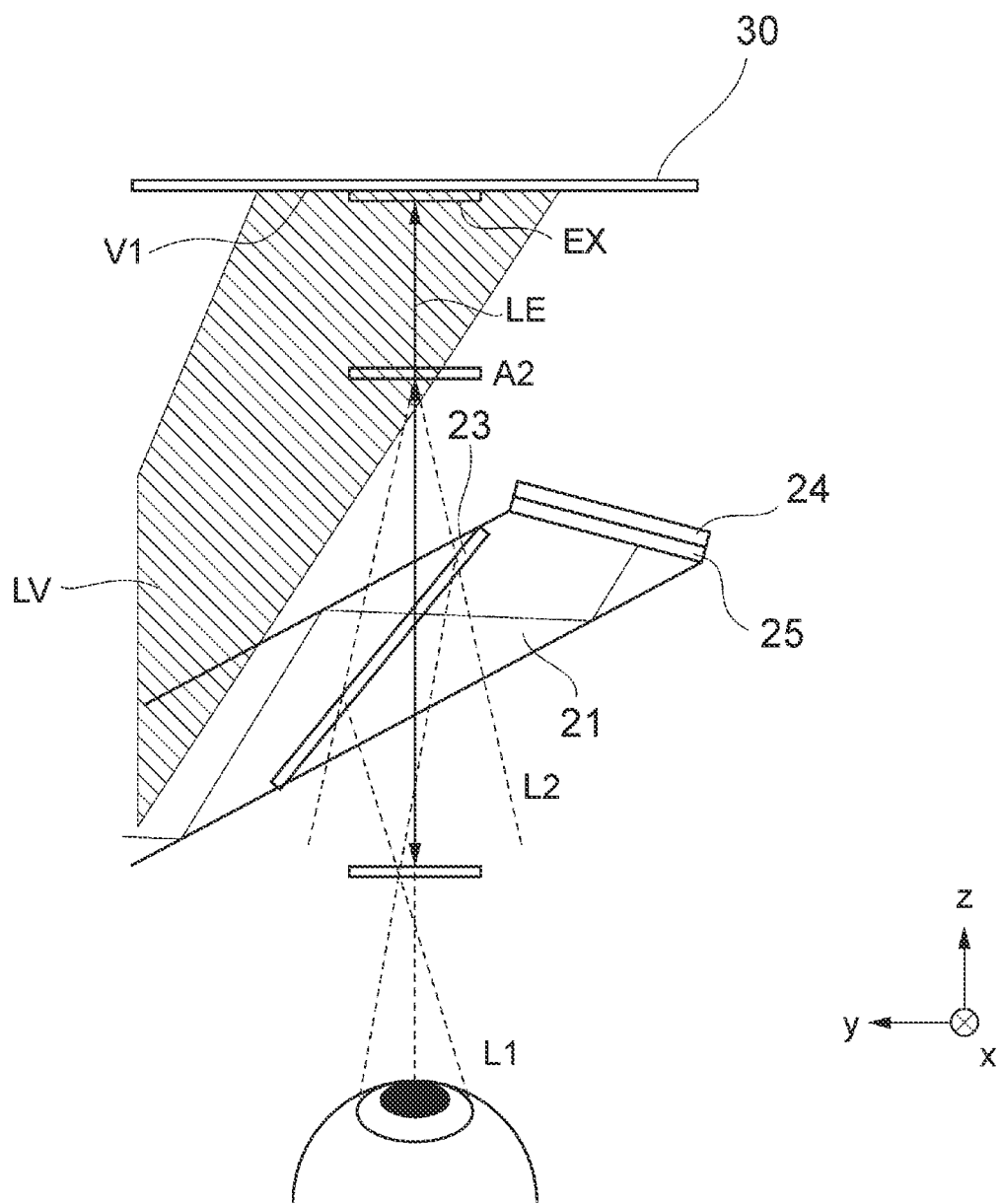
FIG. 8 is an enlarged schematic cross-sectional view showing a first light emission unit of the image projection apparatus according to Embodiment 3.

FIG. 8 is an enlarged schematic cross-sectional view showing the first light emission unit of the image projection apparatus according to the present embodiment. Solid-line arrows and dashed-line arrows shown in FIG. 8 schematically indicate paths of light. In FIG. 8, a region hatched with diagonal lines indicates a region irradiated with the irradiation light LV. Similarly to Embodiment 1, the first light emitted from the image irradiation unit 40 or the second light emitted from the image irradiation unit 50 enters the optical waveguide unit 21 from the light incidence unit 22 and is guided as the guided light while being totally reflected by the optical waveguide unit 21. The guided light reflected by the beam splitter 23 is extracted as the irradiation light LE to the external screen 30, and the image EX is projected on the external screen 30.

The guided light transmitted through the beam splitter 23 is reflected by the partial reflection unit 25 and the retroreflection unit 24, then enters the beam splitter 23 again, is reflected, and is extracted in the direction of the viewpoint 60 as imaging light L1 and L2. At this time, since the light reflected by the partial reflection unit 25 is specularly reflected, the guided light propagated in the optical waveguide unit 21 while increasing the light diameter is reflected by the beam splitter 23 and travels while increasing the light diameter until reaching the viewpoint 60. Accordingly, at the viewpoint 60, it is viewed that an aerial image A2 is formed in a space between the optical waveguide unit 21 and the external screen 30.

The light transmitted through the partial reflection unit 25 is incident on the retroreflection unit 24, and the guided light is retroreflected by the retroreflection unit 24, reflected by the beam splitter 23, and travels while reducing the light diameter until the light reaches the viewpoint 60. Accordingly, at the viewpoint 60, it is viewed that the aerial image A1 is formed in a space between the optical waveguide unit 21 and the viewpoint 60. The traveling direction of the irradiation light LV projected from the second light emission unit onto the external screen 30 is a direction intersecting the viewpoint direction which is the traveling direction of the imaging light L1 and L2, and the image V1 is projected onto the external screen 30.

Figure 9A:
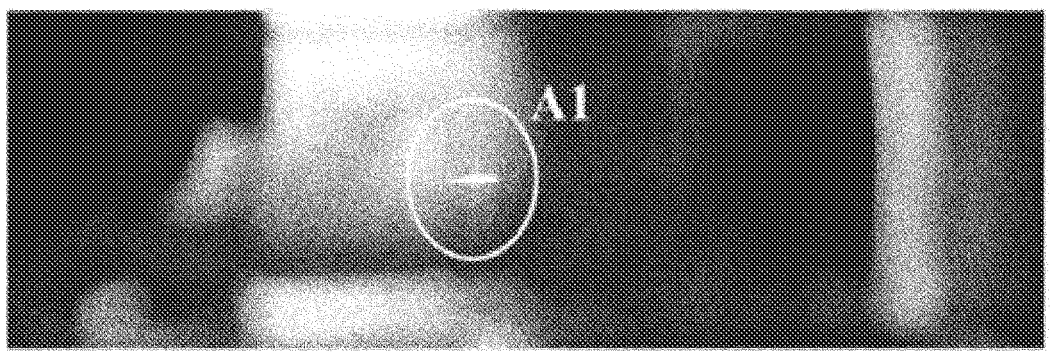
FIG. 9A is a photograph obtained by capturing an image EX and an image V1 projected on an external screen 30 and aerial images A1 and A2 formed in the air with a camera installed at a position of a viewpoint 60, and is a photograph in which the camera is focused on an imaging position of the aerial image A1.
Figure 9B:
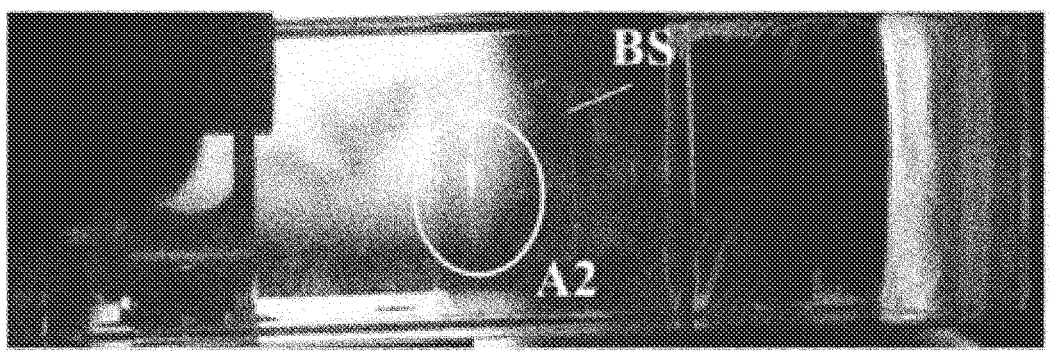
FIG. 9B is a photograph obtained by capturing the image EX and the image V1 projected on the external screen 30 and the aerial images A1 and A2 formed in the air with the camera installed at the position of the viewpoint 60, and is a photograph in which the camera is focused on an imaging position of the aerial image A2.
Figure 9C:
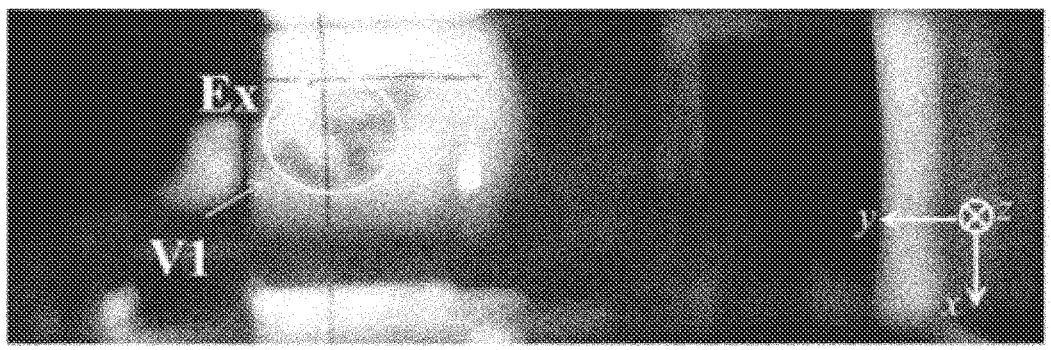
FIG. 9C is a photograph obtained by capturing the image EX and the image V1 projected on the external screen 30 and the aerial images A1 and A2 formed in the air with the camera installed at the position of the viewpoint 60, and is a photograph in which the camera is focused on the external screen 30.

FIGS. 9A, 9B, and 9C are photographs obtained by capturing the image EX and the image V1 projected on the external screen 30 and aerial images A1 and A2 formed in the air with the camera installed at the position of the viewpoint 60. In FIG. 9A, the camera is focused on the imaging position of the aerial image A1, in FIG. 9B, the camera is focused on the imaging position of the aerial image A2, and in FIG. 9C, the camera is focused on the external screen 30. The aerial images A1 and A2 and the image EX are captured at positions indicated by ellipses of white lines in the photographs, and the image V1 is captured in a range larger than the image EX.

As shown in FIG. 9A, the focus is placed closer to the viewpoint 60 than the optical waveguide unit 21, so that the aerial image A1 can be clearly captured. As shown in FIG. 9B, the focus is placed between the optical waveguide unit 21 and the external screen 30, so that the aerial image A2 can be clearly captured. As shown in FIG. 9C, by focusing on the external screen 30, the image EX and the image V1 can be clearly captured. Further, the aerial images A1 and A2, the image EX, and the image V1 can be viewed close to each other in the same field of view, and the viewer can select a target to be viewed only by adjusting a focal length of vision.

Figure 10A:
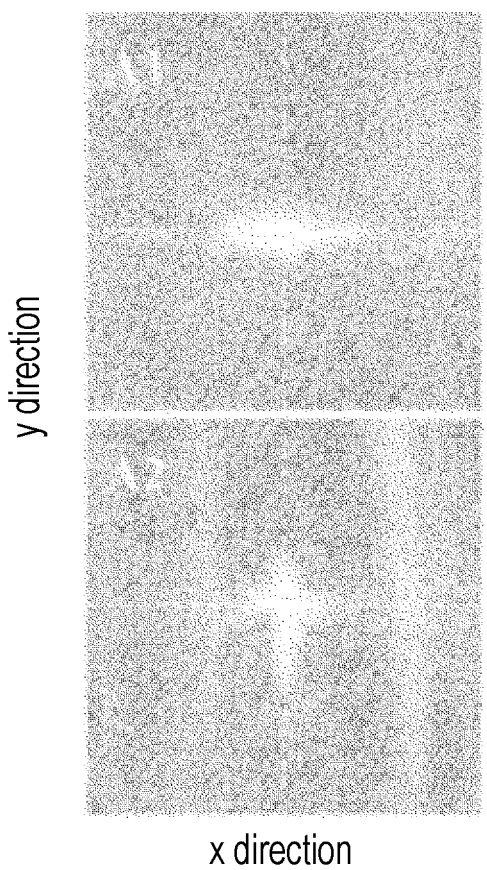
FIG. 10A shows beam profiles of the aerial images A1 and A2, and is a photograph focused from the position of the viewpoint 60.
Figure 10B:
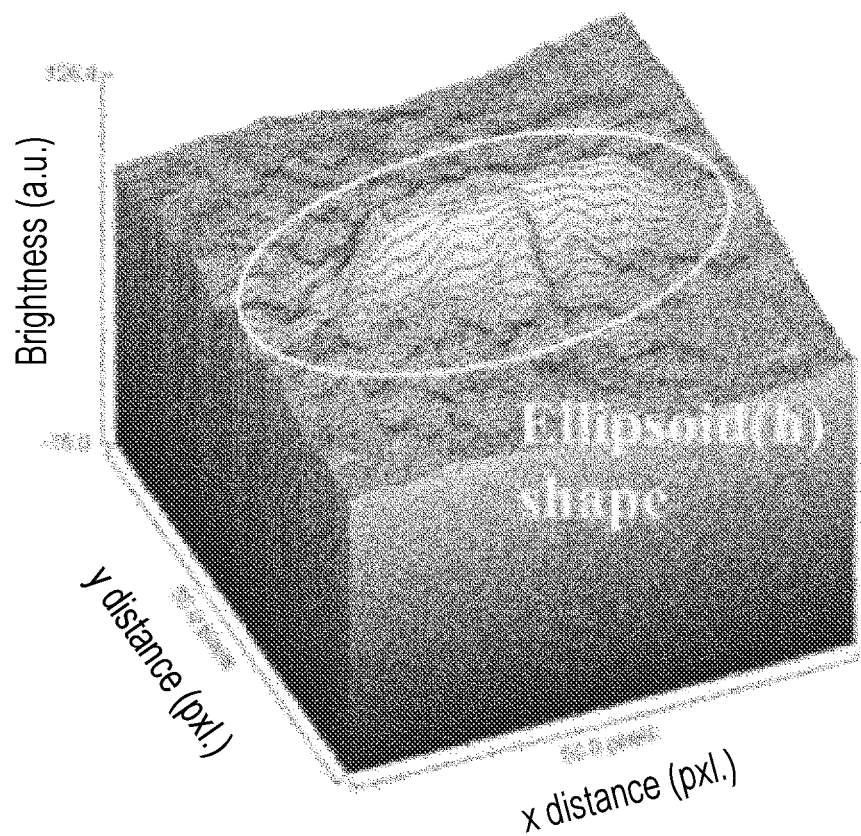
FIG. 10B shows the beam profiles of the aerial images A1 and A2, and shows a three-dimensional brightness profile at an imaging position.
Figure 10C:
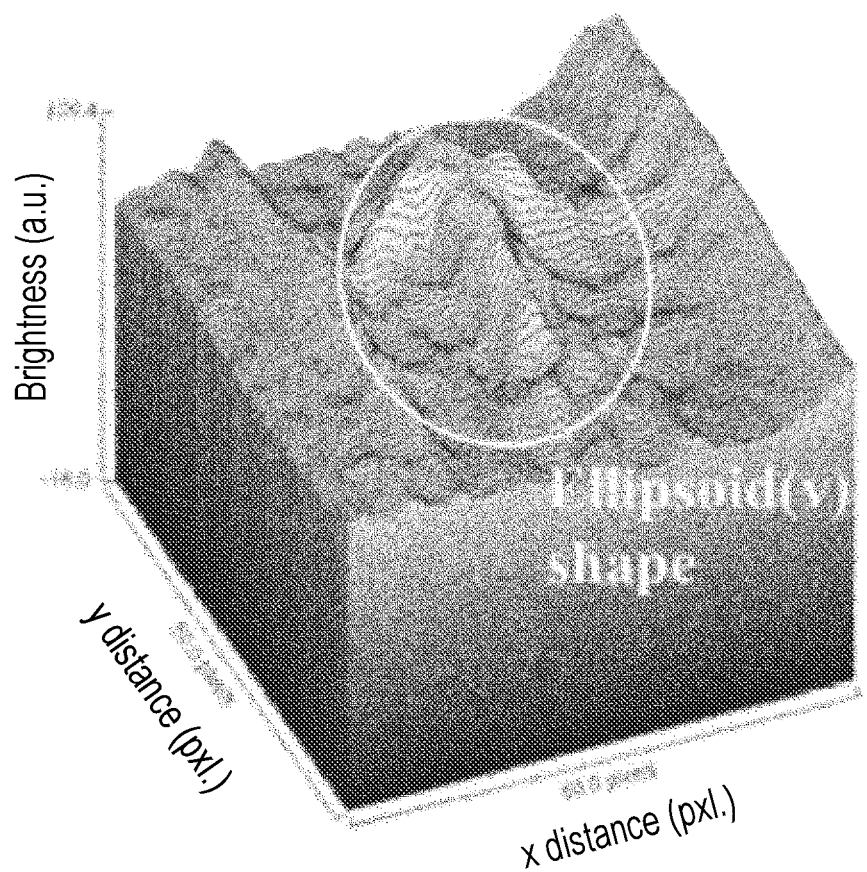
FIG. 10C shows the beam profiles of the aerial images A1 and A2, and shows a three-dimensional brightness profile at an imaging position.
Figure 10D:
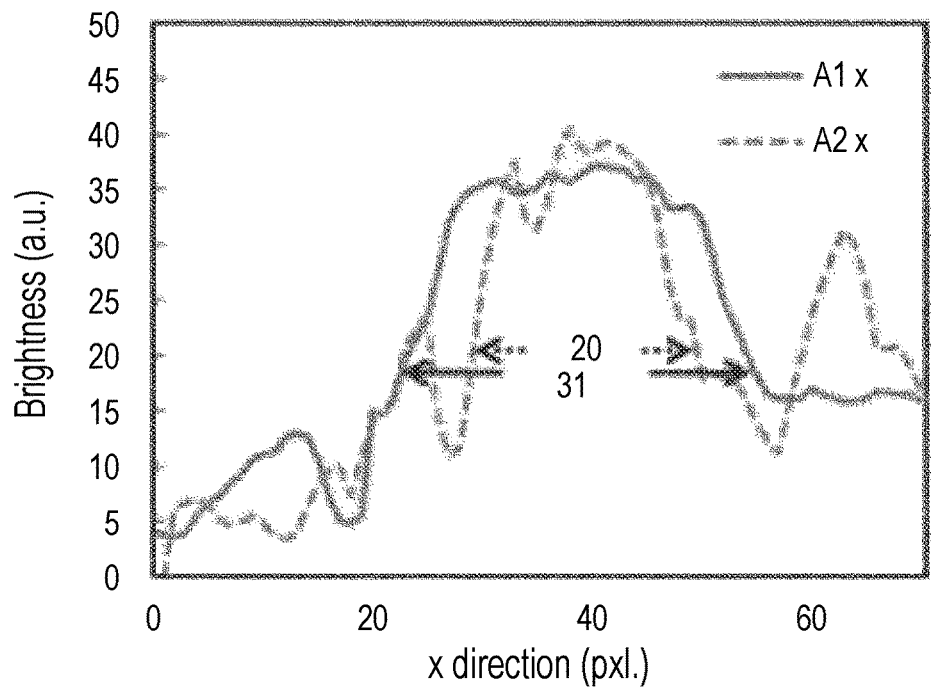
FIG. 10D shows the beam profiles of the aerial images A1 and A2, and is a brightness profile in an x direction.
Figure 10E:
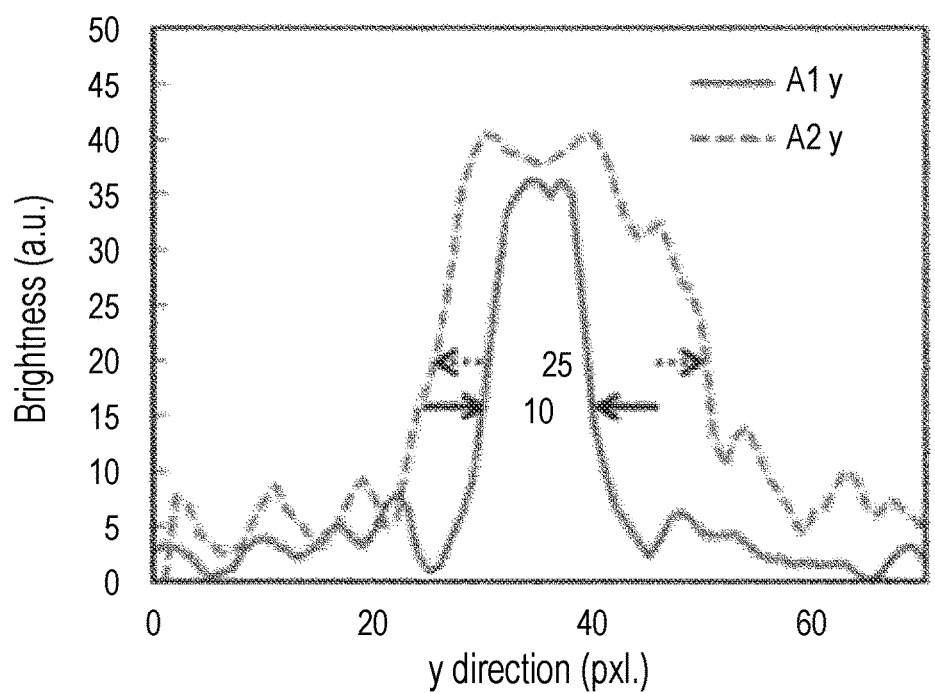
FIG. 10E shows the beam profiles of the aerial images A1 and A2, and is a brightness profile in a y direction.

FIGS. 10A, 10B, 10C, 10D, and 10E show beam profiles of the aerial images A1 and A2. FIG. 10A is a photograph focused from the position of the viewpoint 60. FIGS. 10B and 10C show three-dimensional brightness profiles at the imaging position. FIG. 10D is a brightness profile in an x direction. FIG. 10E is a brightness profile in a y direction. FIGS. 10A and 10B are enlarged views of regions surrounded by white lines in FIGS. 9A and 9B, respectively. FIGS. 10C to 10E show measurement results of the brightness at the imaging positions of the aerial images A1 and A2, respectively. The "x direction" and the "y direction" shown in FIGS. 10A, 10B, 10C, 10D, and 10E indicate an x-axis direction and a y-axis direction shown in FIG. 9C.

As shown in FIGS. 10A to 10C, the aerial image A1 is imaged as an elliptical shape elongated in the x-axis direction, and the aerial image A2 is imaged as an elliptical shape elongated in the y-axis direction. As shown in FIGS. 10D and 10E, a half width of the aerial image A1 in the x-axis direction is about 31 pixels, and a half width of the aerial image A1 in the y-axis direction is about 10 pixels. A half width of the aerial image A2 in the x-axis direction is about 20 pixels, and a half width of the aerial image A2 in the y-axis direction is about 25 pixels. Therefore, the aerial images A1 and A2 are formed in different shapes, and the shapes viewed when the viewer changes the focal length of vision change between the aerial images A1 and A2.

As described above, in the image projection apparatus of the present embodiment, the aerial image A2 is formed by the guided light specularly reflected by the partial reflection unit 25 at the end of the optical waveguide unit 21, and the aerial image A1 is formed by the guided light retroreflected by the retroreflection unit 24. Further, the image EX and the image V1 are projected on the external screen 30. Accordingly, it is possible to project and view a plurality of images at positions having different distances from the viewpoint. Further, the diffraction grating unit 10 is provided in the light incidence unit 22 of the light guide plate unit 20, and the beam splitter 23, the partial reflection unit 25, and the retroreflection unit 24 are provided to constitute the first light emission unit. Therefore, a complicated optical design and an increase in the number of parts are not required, and it is possible to reduce the size and weight.

Embodiment 4

Figure 11:
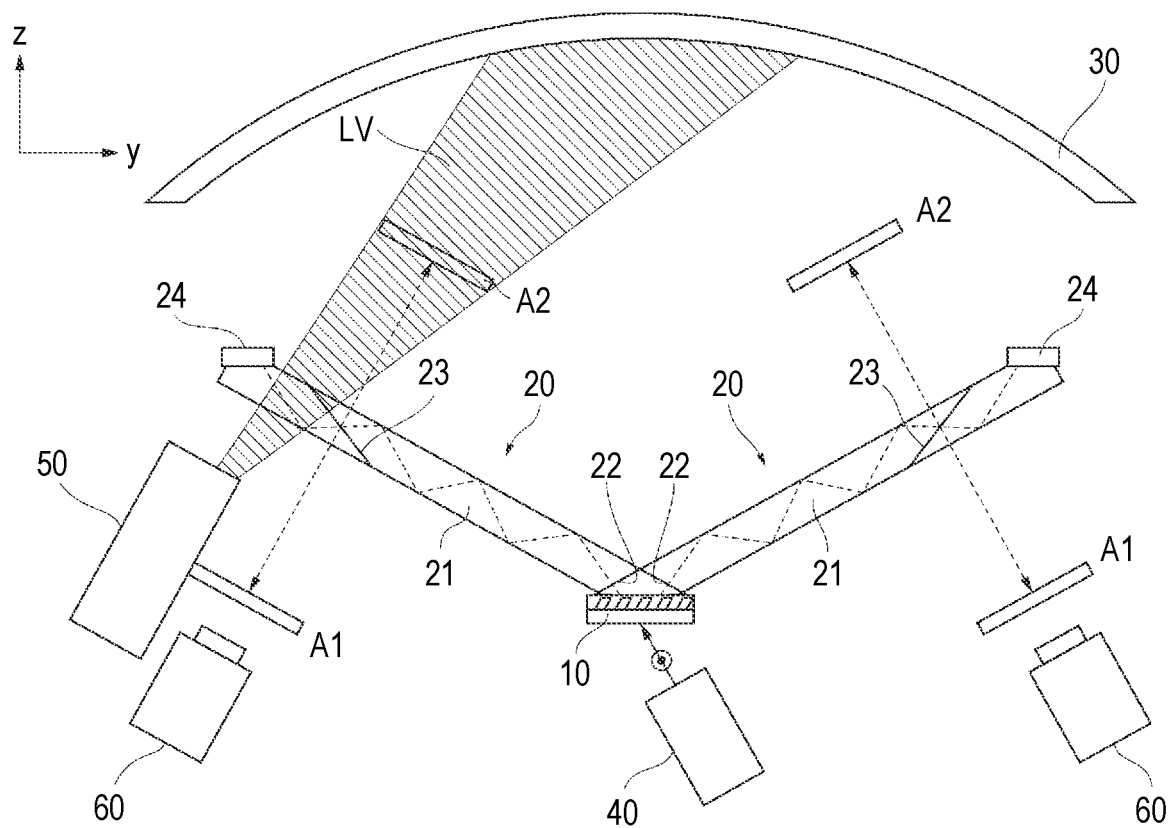
FIG. 11 is a schematic diagram showing a structure of an image projection apparatus according to Embodiment 4.

Next, Embodiment 4 of the present disclosure will be described with reference to FIG. 11. Description of contents overlapping with Embodiment 1 will be omitted. FIG. 11 is a schematic diagram showing a structure of an image projection apparatus according to the present embodiment. In the present embodiment, two light guide plate units 20 are provided, and a common diffraction grating unit 10 is arranged to face the light incidence units 22 provided in the respective light guide plate units 20.

As shown in FIG. 11, the image projection apparatus includes one diffraction grating unit 10, two light guide plate units 20, the external screen 30, and the image irradiation units 40 and 50. A viewer wearing the image projection apparatus views the light guide plate units 20 and a direction of the external screen 30 with both eyes from positions of two viewpoints 60. As shown in FIG. 1, the diffraction grating unit 10 is an optical element including the flat-plate portion 11, the convex portions 12, the concave portions 13, and the covering portion, and is formed separately from the light guide plate unit 20. Each of the light guide plate units 20 is a plate-shaped member made of a translucent material, and includes the optical waveguide unit 21, the light incidence unit 22, the beam splitter 23, and the retroreflection unit 24.

The light incidence units 22 of the two light guide plate units 20 are arranged adjacent to each other, and the common diffraction grating unit 10 is arranged across the two light incidence units 22 so as to face the two light incidence units 22. Further, the first light is incident on the diffraction grating unit 10 from the one image irradiation unit 40, and the first light diffracted by the diffraction grating unit 10 is incident on the optical waveguide unit 21 from the light incidence unit 22 of each light guide plate unit 20. Each of the two light guide plate units 20 has a flat plate shape and is arranged in a V-shape.

As shown in FIG. 1, in the diffraction grating unit 10, the first light is diffracted by the uneven portion constituted by the convex portions 12 and the concave portions 13, the 0th-order light T1 and the +1st-order light I1 travel rightward in the figure, and the −1st-order light T2 and the −2nd-order light I2 travel leftward in the figure. Therefore, the 0th-order light T1 and the +1st-order light I1 are incident on the optical waveguide unit 21 arranged to face the right half of the diffraction grating unit 10, and the −1st-order light T2 and the −2nd-order light I2 are incident on the optical waveguide unit 21 arranged to face the left half of the diffraction grating unit 10.

In the example shown in FIG. 11, by designing an inclination angle of the light incidence unit 22 and a shape of the optical waveguide unit 21 so that the +1st-order light I1 satisfies a total reflection condition of the optical waveguide unit 21 arranged on the right side, the +1st-order light I1 is guided as guided light. Similarly, by designing the inclination angle of the light incidence unit 22 and the shape of the optical waveguide unit 21 so that the −2nd-order light I2 satisfies a total reflection condition of the optical waveguide unit 21 arranged on the left side, the −2nd-order light I2 is guided as guided light.

The first light (guided light) guided in each of the two light guide plate units 20 is reflected by the beam splitter 23 and the retroreflection unit 24 provided on the other end side, and is extracted in the direction of the viewpoint 60 to form the aerial image A1. Although not shown in FIG. 11, in a case where the partial reflection unit 25 is provided between the retroreflection unit 24 and the beam splitter 23 as in Embodiment 3, the aerial image A2 can be formed between the optical waveguide unit 21 and the external screen 30.

The image irradiation unit 50 can directly irradiate the external screen 30 with the irradiation light LV through the light guide plate unit 20 to project the image V1 over a wide region on the external screen 30. Although FIG. 11 shows a state in which the irradiation light LV emitted from the image irradiation unit 50 is projected on the left half of the external screen 30, it is possible to irradiate the entire external screen 30 with the irradiation light LV and project the image V1 on the entire external screen 30 so as to cover the entire field of view by using a separate optical member such as a lens.

As described above, in the image projection apparatus of the present embodiment, since the diffraction grating unit 10 common to the two light guide plate units 20 is provided, the formation of the aerial images A1 and A2 can be visually recognized by both eyes of the viewer. Further, by projecting the image V1, which is the background image, onto the external screen 30 with the irradiation light LV emitted by the image irradiation unit 50, the aerial images A1 and A2 can be superimposed on the image V1 and projected. Also, in the image projection apparatus of the present embodiment, a complicated optical design and an increase in the number of parts are not required, and it is possible to reduce the size and weight.

Modification of Embodiment 4

Figure 12:
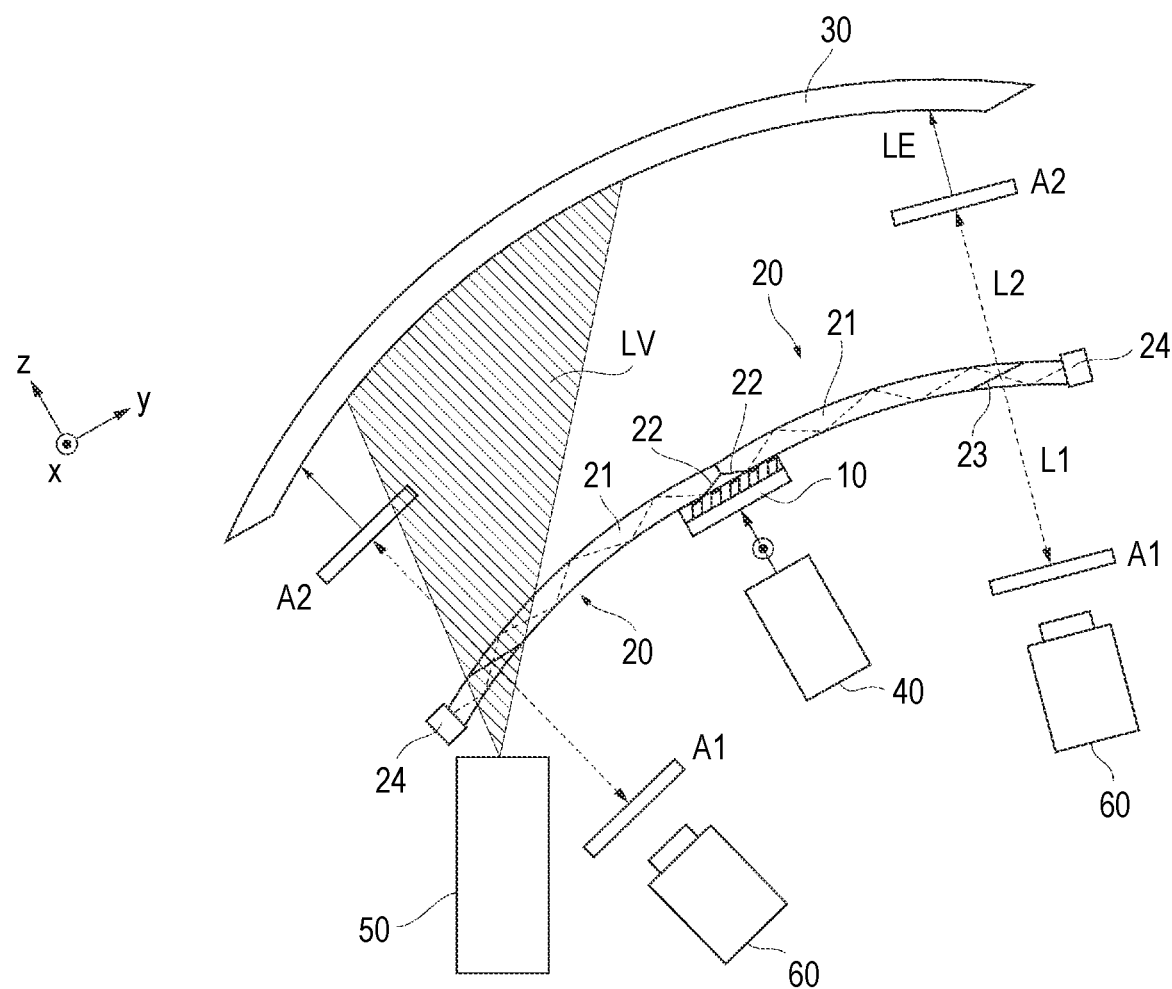
FIG. 12 is a schematic diagram showing a structure of an image projection apparatus according to a modification of Embodiment 4.

Next, a modification of Embodiment 4 of the present disclosure will be described with reference to FIG. 12. Description of contents overlapping with Embodiment 1 will be omitted. FIG. 12 is a schematic diagram showing a structure of an image projection apparatus according to a modification of Embodiment 4. The present modification is different from Embodiment 4 in that the light guide plate unit 20 has a curved shape.

In the example shown in FIG. 12, by designing an inclination angle of the light incidence unit 22 and a shape of the optical waveguide unit 21 so that the 0th-order light T1 satisfies a total reflection condition of the optical waveguide unit 21 arranged on the right side, the 0th-order light T1 is guided as guided light. Similarly, by designing the inclination angle of the light incidence unit 22 and the shape of the optical waveguide unit 21 so that the −1st-order light T2 satisfies a total reflection condition of the optical waveguide unit 21 arranged on the left side, the −1st-order light T2 is guided as guided light. In the present modification, as in Embodiment 4, it is possible to view the aerial images A1 and A2 formed in the air and the image V1 projected on the external screen 30 from the positions of the two viewpoints 60.

Further, in the example shown in FIG. 12, the two light guide plate units 20 each have a curved shape along the direction of the viewpoint 60. However, since the incident angle of the first light from the diffraction grating unit 10 to the light incidence unit 22 is determined by the diffraction condition, the light guide plate units 20 can be designed so as to repeat total reflection along curved surfaces thereof. In addition, in FIG. 12, the left and right light guide plate units 20 are drawn in a shape close to a line symmetry, but the inclination angle or the like of the light incidence unit 22 may be different between the left and right depending on which light of the first light diffracted by the diffraction grating unit 10 is used as the guided light.

In the present modification, since the optical waveguide unit 21 has a curved shape, the degree of design freedom of the image projection apparatus is improved, and it is possible to improve designability and comfort at the time of wearing.

Embodiment 5

Figure 13:
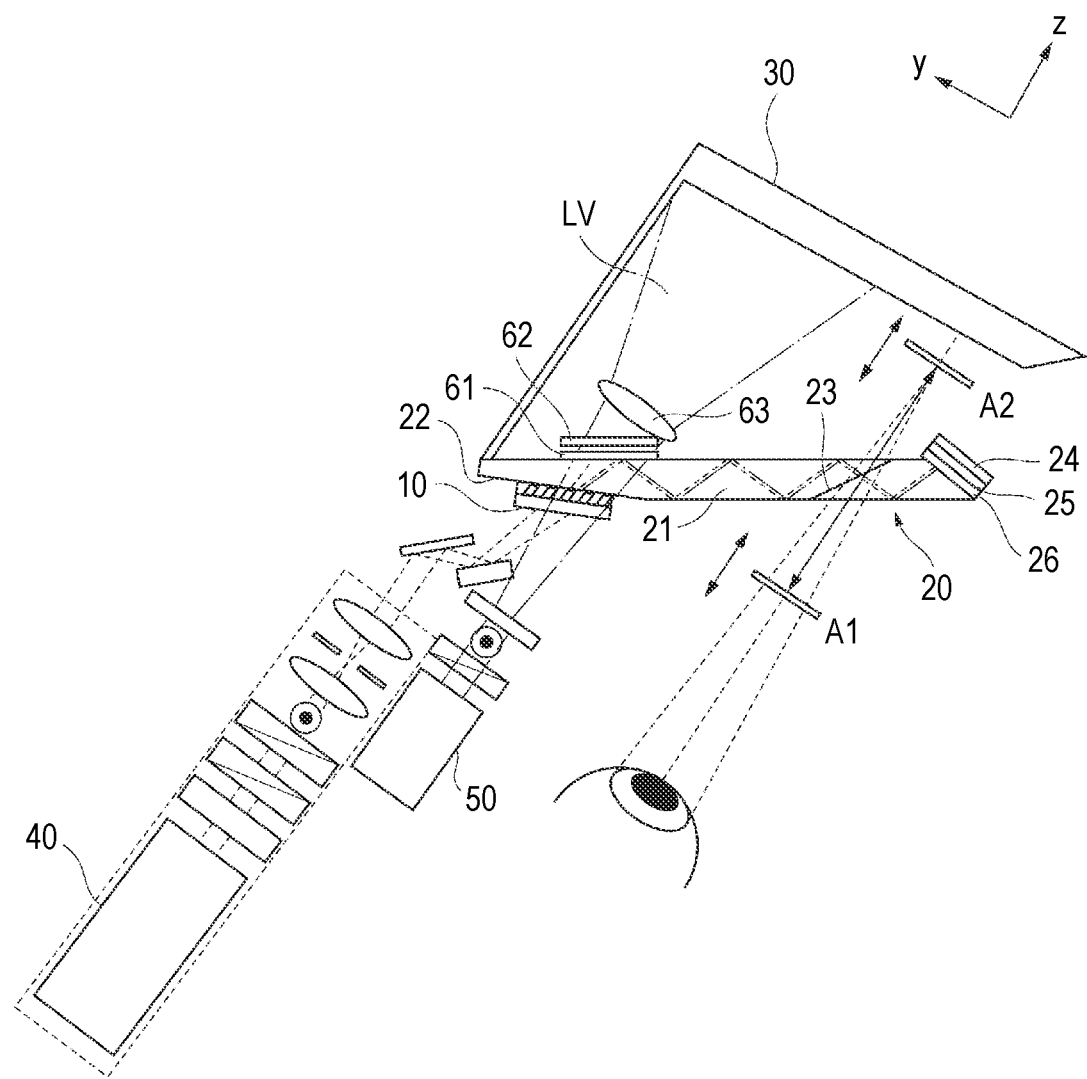
FIG. 13 is a schematic diagram showing a structure of an image projection apparatus according to Embodiment 5.
Figure 14:
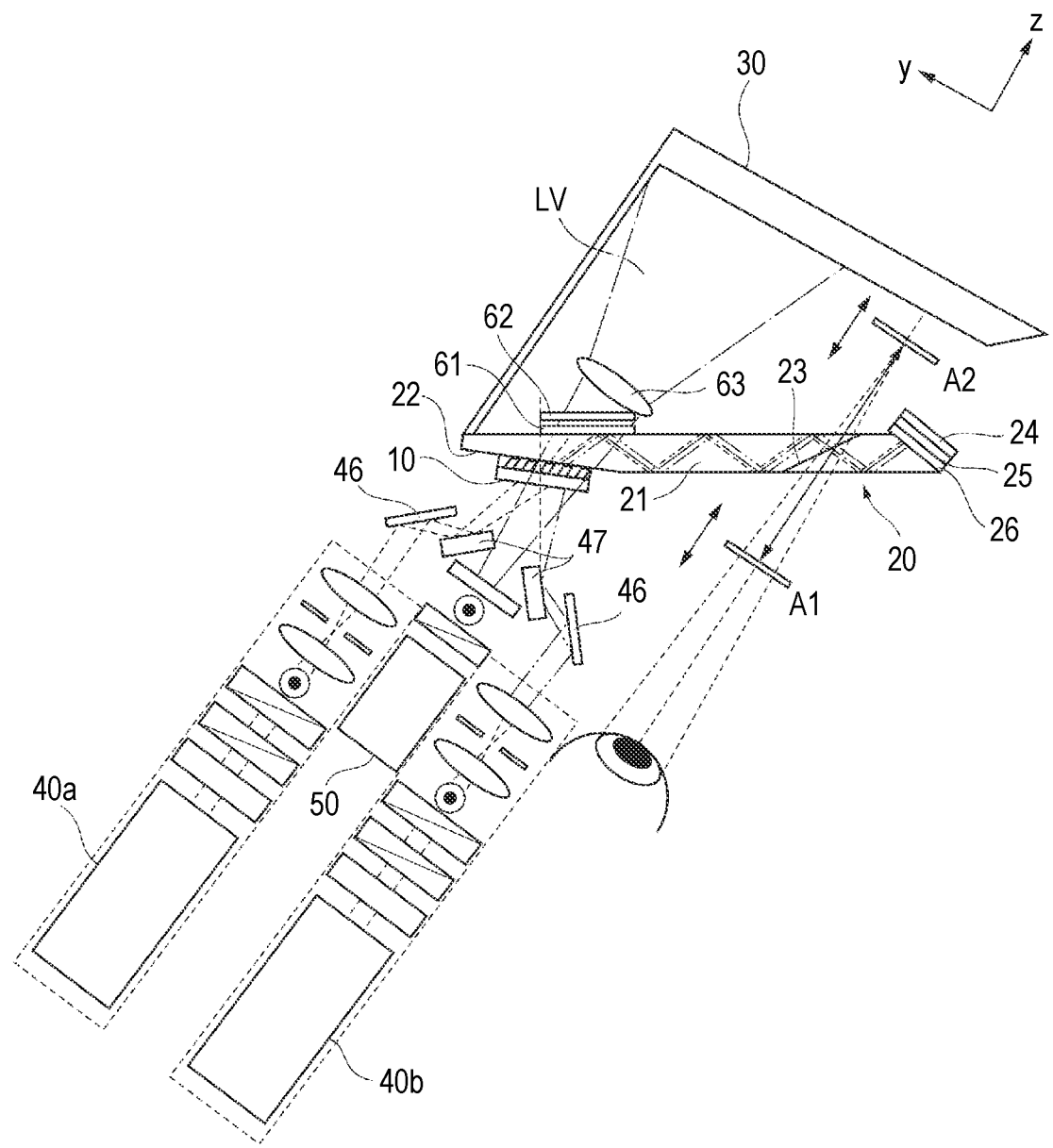
FIG. 14 is a schematic diagram showing a structure of an image projection apparatus according to a modification of Embodiment 5.

Next, Embodiment 5 of the present disclosure will be described with reference to FIGS. 13 and 14. Description of contents overlapping with Embodiment 1 will be omitted. FIG. 13 is a schematic diagram showing a structure of an image projection apparatus according to the present embodiment. As shown in FIG. 13, the image projection apparatus includes the diffraction grating unit 10, the light guide plate unit 20, the external screen 30, and the image irradiation units 40 and 50. A viewer wearing the image projection apparatus views the light guide plate unit 20 and a direction of the external screen 30 from a position of a viewpoint 60.

As shown in FIG. 1, the diffraction grating unit 10 is an optical element including the flat-plate portion 11, the convex portions 12, the concave portions 13, and the covering portion, and is formed separately from the light guide plate unit 20. The light guide plate unit is a plate-shaped member made of a translucent material, and includes the optical waveguide unit 21, the light incidence unit 22, the beam splitter 23, the retroreflection unit 24, the partial reflection unit 25, and an optical filter 26. An optical filter 61, an optical shutter unit 62, and a projection lens 63 are provided in the second light emission unit from which the second light from the image irradiation unit 50 is extracted.

The optical filters 26 and 61 are optical members that transmit light in a predetermined wavelength range and block light with other wavelengths. In the present embodiment, a band-pass filter that blocks the wavelength of the second light and transmits the wavelength of the first light or an optical filter corresponding thereto is used as the optical filter 26. A band-pass filter that blocks the wavelength of the first light and transmits the wavelength of the second light or an optical filter corresponding thereto is used as the optical filter 61. For example, the first light emitted by the image irradiation unit 40 is red light, and the second light emitted by the image irradiation unit 50 is green light. Therefore, a long pass filter may be used as the optical filter 26, and a short pass filter may be used as the optical filter 61.

The optical shutter unit 62 is an optical member that is driven and controlled by a control unit (not shown) and switches between transmission and blocking of light. A specific configuration of the optical shutter unit 62 is not limited, and a liquid crystal shutter or the like can be used. The projection lens 63 is an optical member that increases the light diameter of the irradiation light LV extracted from the second light emission unit and projects the irradiation light LV onto the external screen 30. Although FIG. 13 shows one lens as the projection lens 63, the projection lens 63 may be configured by combining a plurality of lenses.

In the first light emitted from the image irradiation unit 40, a part of the light diffracted by the diffraction grating unit 10 is incident from the light incidence unit 22, and is totally reflected in the optical waveguide unit 21 to be guided as guided light. The guided light of the first light reaches the beam splitter 23 while being totally reflected, and is partially reflected to project the image EX on the external screen 30. Of the guided light of the first light, the light transmitted through the beam splitter 23 is totally reflected again and reaches an end of the optical waveguide unit 21.

The guided light of the first light that has reached the end of the optical waveguide unit 21 is transmitted through the optical filter 26 and is incident on the partial reflection unit 25. A part of the guided light is specularly reflected, and the rest is transmitted to reach the retroreflection unit 24. The guided light is retroreflected by the retroreflection unit 24. As described in Embodiment 1, the first light retroreflected by the retroreflection unit 24 is imaged as the aerial image A1 in the air between the viewpoint 60 and the optical waveguide unit 21. In addition, the light specularly reflected by the partial reflection unit 25 is imaged as the aerial image A2 in the air between the optical waveguide unit 21 and the external screen 30.

Light of the first light that does not satisfy the total reflection condition in the optical waveguide unit 21 is extracted from the second light emission unit in the direction of the external screen 30. However, since the optical filter 61 is provided in the second light emission unit, the first light is blocked by the optical filter 61 and is not projected onto the external screen 30.

In the second light emitted from the image irradiation unit 50, a part of the light diffracted by the diffraction grating unit 10 is incident from the light incidence unit 22, and is totally reflected in the optical waveguide unit 21 to be guided as guided light. At this time, by making the incident angle of the second light with respect to the diffraction grating unit 10 different from the incident angle of the first light and selecting an incident angle that is an appropriate diffraction condition, the incident angles of the first light and the second light to the optical waveguide unit 21 can be set to be the same. When incident positions of the first light and the second light to the diffraction grating unit 10 are the same, paths of the first light and the second light that are totally reflected and guided in the optical waveguide unit 21 can be the same.

The guided light of the second light also reaches the beam splitter 23 while being totally reflected, and is partially reflected to project the image EX on the external screen 30. Of the guided light of the second light, the light transmitted through the beam splitter 23 is totally reflected again and reaches an end of the optical waveguide unit 21. The guided light of the second light that has reached the end of the optical waveguide unit 21 is blocked by the optical filter 26 and does not reach the partial reflection unit 25 and the retroreflection unit 24. Therefore, the second light reflected back to the beam splitter 23 disappears, and the aerial images A1 and A2 are not formed by the second light.

Light of the second light that does not satisfy the total reflection condition in the optical waveguide unit 21 is extracted from the second light emission unit in the direction of the external screen 30. In a case where the optical shutter unit 62 is in a transmission state, the external screen 30 is irradiated with the irradiation light LV through the projection lens 63 to project the image V1. In a case where the optical shutter unit 62 is in a blocking state, the irradiation light LV of the second light is blocked and the image V1 is not projected.

As described above, in the present embodiment, since the optical filter 26 is provided between the beam splitter 23 and the retroreflection unit 24, the aerial images A1 and A2 can be formed only by the first light. Since the optical filter 61 is provided in the second light emission unit, the image V1 can be projected onto the external screen 30 only by the second light. Therefore, by making the contents of the aerial images A1 and A2 formed by the first light emitted from the image irradiation unit 40 different from the content of the image V1 projected by the second light emitted from the image irradiation unit 50, it is possible to realize various image projection.

In addition, by including a lens optical unit having a variable focal length in the image irradiation unit 40 and adjusting a divergence angle of the first light incident on the diffraction grating unit 10, it is possible to change imaging efficiency of the aerial images A1 and A2.

Modification of Embodiment 5

Next, a modification of Embodiment 5 of the present disclosure will be described with reference to FIG. 14. Description of contents overlapping with Embodiment 1 will be omitted. FIG. 14 is a schematic diagram showing a structure of an image projection apparatus according to a modification of Embodiment 5. As shown in FIG. 14, the image projection apparatus includes the diffraction grating unit 10, the light guide plate unit 20, the external screen 30, and image irradiation units 40a, 40b, and 50.

In the present modification, the image irradiation unit 40a emits first light with a first wavelength including a first image, the image irradiation unit 40b emits second light with a second wavelength including a second image, and the image irradiation unit 50 emits third light with a third wavelength including a third image. For example, the first wavelength is red light, the second wavelength is blue light, and the third wavelength is green light. In the present modification, a notch filter that blocks the third wavelength and transmits the first wavelength and the second wavelength is used as the optical filter 26, and a band-pass filter that blocks the first wavelength and the second wavelength and transmits the third wavelength is used as the optical filter 61. In the present modification, a dichroic mirror (selective reflection unit) that reflects the first wavelength and transmits the second wavelength is used as the partial reflection unit 25.

The incident angles of the first light, the second light, and the third light emitted from the image irradiation units 40a, 40b, and 50 to the diffraction grating unit 10 are selected so as to satisfy appropriate diffraction conditions, and the light incident on the optical waveguide unit 21 from the diffraction grating unit 10 is totally reflected along the same path and propagates through the optical waveguide unit 21.

In the first light and the second light emitted from the image irradiation units 40a and 40b, a part of the light diffracted by the diffraction grating unit 10 is incident from the light incidence unit 22, and is totally reflected in the optical waveguide unit 21 to be guided as guided light. The guided light of the first light and the second light reaches the beam splitter 23 while being totally reflected, and is partially reflected to project the image EX on the external screen 30. Of the guided light of the first light and the second light, the light transmitted through the beam splitter 23 is totally reflected again and reaches an end of the optical waveguide unit 21.

The guided light of the first light that has reached the end of the optical waveguide unit 21 is transmitted through the optical filter 26, is incident on the partial reflection unit 25, and then is specularly reflected. The first light specularly reflected by the partial reflection unit 25 is imaged as the aerial image A2 in the air between the optical waveguide unit 21 and the external screen 30. In addition, the guided light of the second light that has reached the end of the optical waveguide unit 21 is transmitted through the optical filter 26 and the partial reflection unit 25, is incident on the retroreflection unit 24, and then is retroreflected. As described in Embodiment 1, the second light retroreflected by the retroreflection unit 24 is imaged as the aerial image A1 in the air between the viewpoint 60 and the optical waveguide unit 21.

Light of the first light and the second light that does not satisfy the total reflection condition in the optical waveguide unit 21 is extracted from the second light emission unit in the direction of the external screen 30. However, since the optical filter 61 is provided in the second light emission unit, the first light and the second light are blocked by the optical filter 61 and are not projected onto the external screen 30.

In the third light emitted from the image irradiation unit 50, a part of the light diffracted by the diffraction grating unit 10 is incident from the light incidence unit 22, and is totally reflected in the optical waveguide unit 21 to be guided as guided light. The guided light of the third light also reaches the beam splitter 23 while being totally reflected, and is partially reflected to project the image EX on the external screen 30. Of the guided light of the third light, the light transmitted through the beam splitter 23 is totally reflected again and reaches an end of the optical waveguide unit 21.

The guided light of the third light that has reached the end of the optical waveguide unit 21 is blocked by the optical filter 26 and does not reach the partial reflection unit 25 and the retroreflection unit 24. Therefore, the third light reflected back to the beam splitter 23 disappears, and the aerial images A1 and A2 are not formed by the third light.

Light of the third light that does not satisfy the total reflection condition in the optical waveguide unit 21 is extracted from the second light emission unit in the direction of the external screen 30. In a case where the optical shutter unit 62 is in a transmission state, the external screen 30 is irradiated with the irradiation light LV through the projection lens 63 to project the image V1. In a case where the optical shutter unit 62 is in a blocking state, the irradiation light LV of the second light is blocked and the image V1 is not projected.

As described above, in the present embodiment, since the optical filter 26 is provided between the beam splitter 23 and the retroreflection unit 24, the aerial images A1 and A2 can be formed by the first light and the second light, respectively. Since the optical filter 61 is provided in the second light emission unit, the image V1 can be projected onto the external screen 30 only by the third light. Therefore, by making the contents of the aerial images A1 and A2 formed by the first light and the second light emitted from the image irradiation unit 40 different from the content of the image V1 projected by the third light emitted from the image irradiation unit 50, it is possible to realize various image projection.

Embodiment 6

Figure 15A:
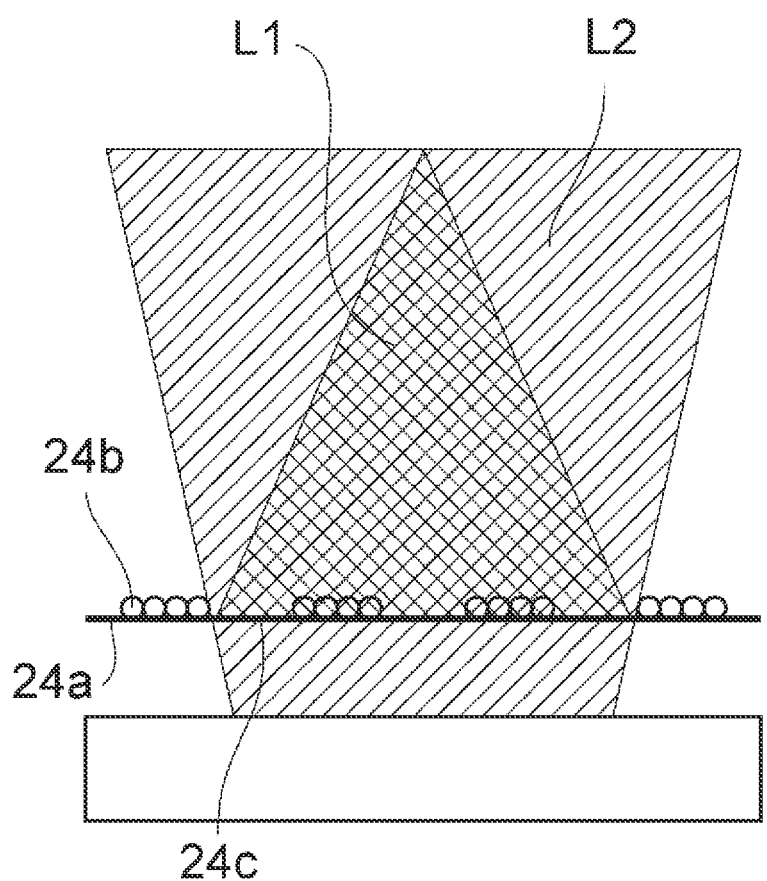
FIG. 15A is a schematic diagram showing a structure example of a retroreflection unit 24 according to Embodiment 6.
Figure 15B:
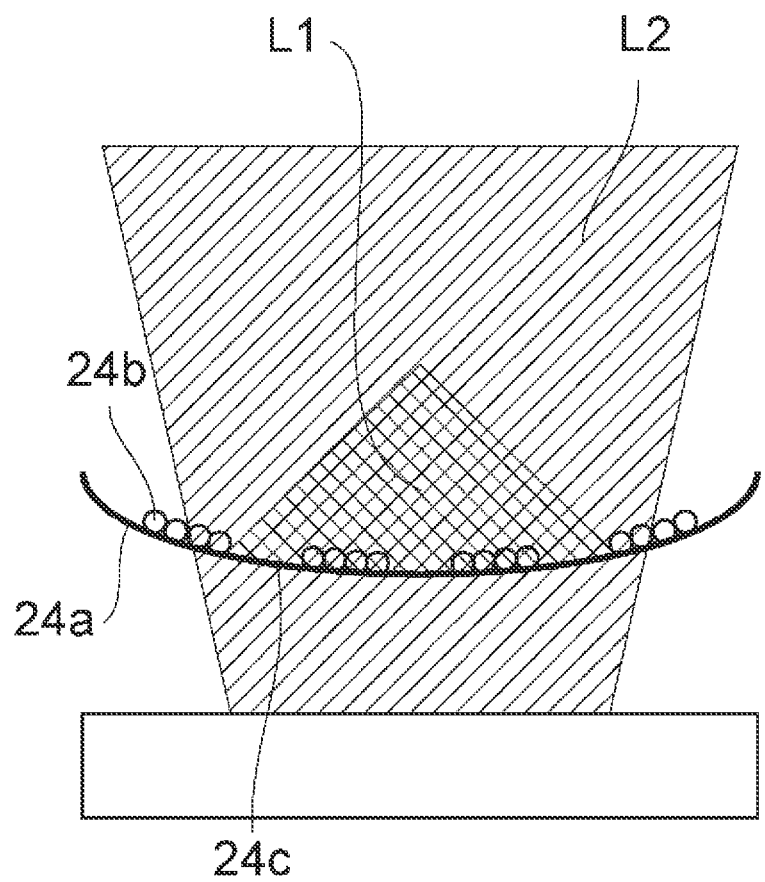
FIG. 15B is a schematic diagram showing a structure example of the retroreflection unit 24 according to Embodiment 6.
Figure 15C:
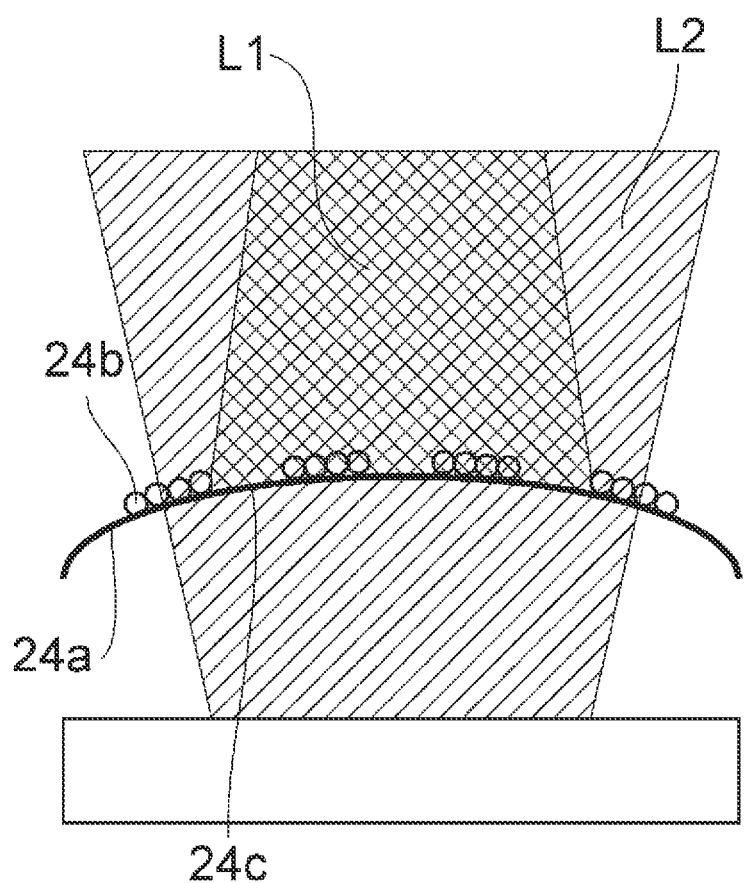
FIG. 15C is a schematic diagram showing a structure example of the retroreflection unit 24 according to Embodiment 6.

Next, Embodiment 6 of the present disclosure will be described with reference to FIGS. 15A, 15B, and 15C. Description of contents overlapping with Embodiment 1 will be omitted. FIGS. 15A, 15B, and 15C are schematic diagrams showing structure examples of the retroreflection unit 24 according to the present embodiment. As shown in FIGS. 15A, 15B, and 15C, in the retroreflection unit 24, microbeads are selectively formed on a seat portion 24a, and a retroreflection region 24b in which the microbeads are formed and a specular reflection region 24c in which the seat portion 24a is exposed are formed in a mixed manner.

The seat portion 24a is a thin plate-shaped member whose surface is a reflection surface. The seat portion 24a preferably has flexibility. Since the seat portion 24a has flexibility, the seat portion 24a can take a shape of a flat plate shown in FIG. 15A, a shape of a concave mirror shown in FIG. 15B, or a shape of a convex mirror shown in FIG. 15C.

The retroreflection region 24b is a region in which the microbeads are formed on a surface of the seat portion 24a. The light incident on the retroreflection region 24b is retroreflected in the incident direction by being reflected in the microbeads. The microbeads are not formed in the specular reflection region 24c, and the reflection surface of the seat portion 24a is exposed. Therefore, the light incident on the specular reflection region 24c is specularly reflected by the reflection surface of the seat portion 24a.

The retroreflection unit 24 of the present example can be formed by a method of forming a mask on the specular reflection region 24c of the seat portion 24a using the photolithography technology and depositing microbeads in a region where the mask is not formed to form the retroreflection region 24b. After the microbeads are deposited, a mask layer is removed to expose the reflection surface of the seat portion 24a in the specular reflection region 24c.

As shown in FIGS. 15A to 15C, a part of the light incident on the retroreflection unit 24 while the light diameter is increased is retroreflected by the retroreflection region 24b as the imaging light L1, and is reflected with a reduced light diameter. Further, in the specular reflection region 24c, the light is retroreflected as the imaging light L2, and is reflected with an increased light diameter. As shown in FIGS. 15A to 15C, it is possible to adjust an enlargement ratio and a reduction ratio of the light diameters of the imaging light L1 and L2 depending on whether the retroreflection unit 24 has a shape of a flat plate, a concave mirror, or a convex mirror.

By using the retroreflection unit 24 of the present embodiment, the guided light that has reached the end of the optical waveguide unit 21 is partially reflected again and a remaining part of the light is specularly reflected, so that the aerial images A1 and A2 can be formed in the same manner as that shown in FIG. 8 in Embodiment 3. The difference from Embodiment 3 is that the seat portion 24a is a thin plate-shaped member and has flexibility as described above. In addition, the retroreflection efficiency can also be designed by adjusting the arrangement and purity of the microbeads on the surface of the seat portion 24a. Further, by depositing a metal thin film on the surface of the seat portion 24a, it is also possible to construct a reflective retroreflection element or a retroreflective optical filter in which reflection and retroreflection are mixed. By using such a structure for the seat portion 24a, it is possible to improve the degree of freedom of optical design and designability.

Embodiment 7

Next, Embodiment 7 of the present disclosure will be described. Description of contents overlapping with Embodiment 1 will be omitted. In Embodiment 1 to Embodiment 6, the first light emitted from the image irradiation unit 40 is used for the projection of the image EX and the image V1 and the formation of the aerial images A1 and A2 at the same wavelength. However, by providing a wavelength conversion unit that converts the wavelength of the first light in the first light emission unit or the second light emission unit, the image EX and the image V1 may be projected and the aerial images A1 and A2 may be formed in a color different from a color of the light emitted from the image irradiation unit 40.

Embodiment 8

Next, Embodiment 8 of the present disclosure will be described. Description of contents overlapping with Embodiment 1 will be omitted. In Embodiment 1 to Embodiment 7, a grating having periodic uneven portions is used as the diffraction grating unit 10. However, the uneven portion of the diffraction grating unit 10 does not need to have a periodic structure, and a holographic grating structure may be used as long as light can be diffracted in at least two directions. Although the diffraction grating unit 10 is formed separately from the light guide plate unit 20, the diffraction grating unit 10 may be formed inside the optical waveguide unit 21 or on the surface of the light incidence unit 22.

Embodiment 9

Figure 16:
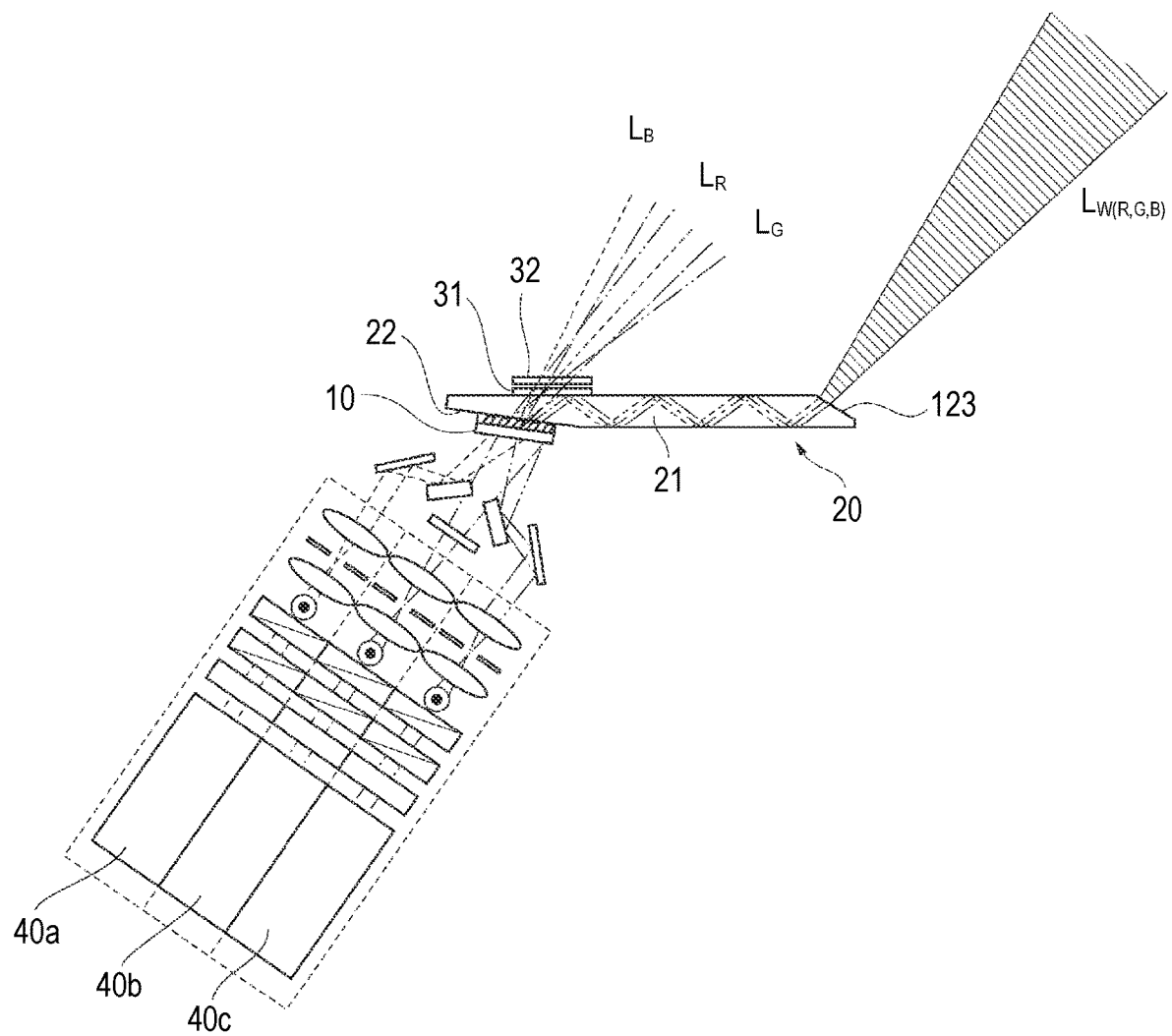
FIG. 16 is a schematic diagram showing a structure of an image projection apparatus according to Embodiment 9.

FIG. 16 is a schematic diagram showing a structure of an image projection apparatus according to the present embodiment. As shown in FIG. 16, the image projection apparatus includes the diffraction grating unit 10, the light guide plate unit 20, and image irradiation units 40a, 40b, and 40c. The light guide plate unit 20 includes the optical waveguide unit 21, the light incidence unit 22, a light emission unit 123, an optical filter 31, and an optical shutter unit 32. The diffraction grating unit 10 corresponds to a first diffraction grating unit in the present disclosure.

In the optical waveguide unit 21, since the light is transmitted from one surface side to the other surface side of the optical waveguide unit 21, the viewer can view a direction of an external screen 160 through the optical waveguide unit 21. On one end side of the optical waveguide unit 21, the light incidence unit 22 which is a surface inclined with respect to the main surface is formed, and the diffraction grating unit 10 is arranged. On the other end side of the optical waveguide unit 21, an end surface is formed and the light emission unit 123 is provided.

The light incidence unit 22 is an inclined surface formed at one end of the optical waveguide unit 21, is arranged adjacent to the diffraction grating unit 10, and corresponds to a third light incidence unit in the present disclosure. The light incidence unit 22 may be provided with an antireflection film or a refractive index adjustment unit in order to increase an optical coupling ratio with the diffraction grating unit 10.

The light emission unit 123 is an inclined surface formed at the other end (at the end opposite to the light incidence unit 22) of the optical waveguide unit 21, and corresponds to a third light emission unit in the present disclosure. The inclined surface of the light emission unit 123 has an angle at which the light propagated through the optical waveguide unit 21 is not totally reflected by the light emission unit 123. In order to improve light extraction efficiency from the light emission unit 123, an antireflection film or an antireflection structure may be provided on a surface of the light emission unit 123.

The optical filter 31 is an optical member that transmits light in a predetermined wavelength range and blocks light with other wavelengths. In the present embodiment, a band-pass filter that blocks a wavelength of light with a predetermined wavelength and transmits other wavelengths is used as the optical filter 31.

The optical shutter unit 32 is an optical member that is driven and controlled by a control unit (not shown) and switches between transmission and blocking of light. A specific configuration of the optical shutter unit 32 is not limited, and a liquid crystal shutter or the like can be used.

The image irradiation units 40a, 40b, and 40c are devices that irradiate the diffraction grating unit 10 with first light, second light, and third light for projecting a first image, a second image, and a third image, respectively. The image irradiation units 40a and 40b correspond to a third image irradiation unit and a fourth image irradiation unit in the present disclosure, respectively. The image irradiation units 40a, 40b, and 40c are provided as separate structures, and incident angles of the first light, the second light, and the third light with respect to the diffraction grating unit 10 are different from each other. The wavelengths of the first light, the second light, and the third light are different. For example, the first light is red light, the second light is green light, and the third light is blue light.

Specific configurations of the image irradiation units 40a, 40b, and 40c are not limited, but in the example shown in FIG. 16, the image irradiation units 40a, 40b, and 40c each include a light source unit, a half-wavelength plate, and a polarizer. The image irradiation units 40a, 40b, and 40c irradiate the diffraction grating unit 10 with light through mirrors, band-pass filters, and the like. A laser light source is preferably used as the light source unit, and a laser beam emitted from the light source unit is emitted to an image forming unit (not shown) to include the first image, the second image, and the third image in the first light, the second light, and the third light. A liquid crystal display element, a digital mirror device, or the like can be used as the image forming unit, and the image forming unit may be provided inside the image irradiation units 40a, 40b, and 40c, or may be arranged on an optical path to the diffraction grating unit 10.

Figure 17:
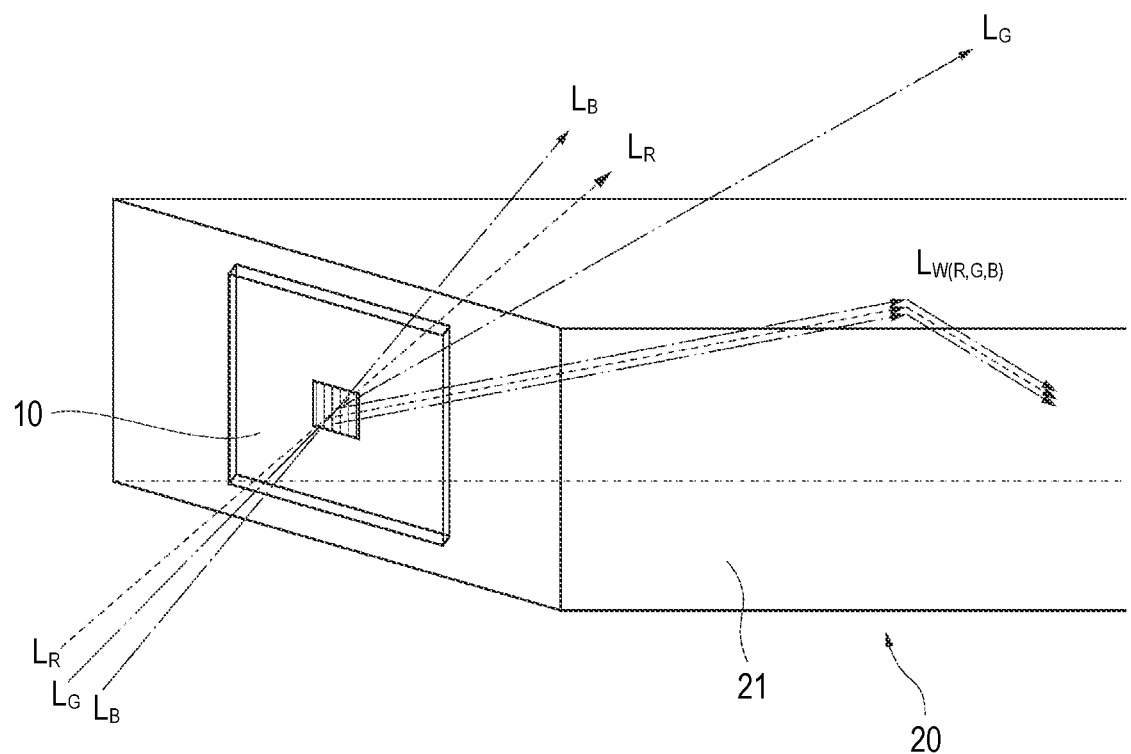
FIG. 17 is an enlarged schematic perspective view showing a light incidence unit 22 of the image projection apparatus according to Embodiment 9.

Next, image projection in the image projection apparatus of the present embodiment will be described with reference to FIGS. 16 and 17. FIG. 17 is an enlarged schematic perspective view showing the light incidence unit 22 of the image projection apparatus according to the present embodiment. A dashed-line arrow shown in FIG. 17 indicates a path of first light LR, a two-dot chain line indicates a path of second light LG, and a one-dot chain line indicates a path of third light LB.

The first light LR, the second light LG, and the third light LB emitted from the image irradiation units 40a, 40b, and 40c reach the diffraction grating unit 10 at different incident angles. In the diffraction grating unit 10, the 0th-order light T1, the −1st-order light T2, the +1st-order light I1, and the −2nd-order light I2 are extracted as diffracted light according to the incident angles of the first light, the second light, and the third light, and are incident on the light incidence unit 22.

Since an incident angle of the diffracted light incident on the light incidence unit 22 from the diffraction grating unit 10 to the light incidence unit 22 is determined by the diffraction condition, the inclination angle of the light incidence unit 22 is set in advance so that any one of the 0th-order light T1, the −1st-order light T2, the +1st-order light I1, and the −2nd-order light I2 satisfies the total reflection condition on both surfaces of the optical waveguide unit 21. For example, the incident angles of the first light LR, the second light LG, and the third light LB to the diffraction grating unit 10 are set in advance so that the +1st-order light I1 of each of the first light LR, the second light LG, and the third light LB is incident on the light incidence unit 22 at the same angle.

Of the diffracted light of the first light LR, the second light LG, and the third light LB diffracted by the diffraction grating unit 10, light that satisfies the total reflection condition of the optical waveguide unit 21 propagates as guided light while being totally reflected in the optical waveguide unit 21. At this time, as shown in FIGS. 16 and 17, first guided light, second guided light, and third guided light are incident on the optical waveguide unit 21 from the same position of the light incidence unit 22, travel at the same angle, and are totally reflected repeatedly at the same position, and thus reach the same position of the light emission unit 123 along the same path. In other words, an incident position of the first guided light in the light incidence unit 22, an incident position of the second guided light in the light incidence unit 22, and an incident position of the third guided light in the light incidence unit 22 are substantially the same. A reflection position of the first guided light in the optical waveguide unit 21, a reflection position of the second guided light in the optical waveguide unit 21, and a reflection position of the third guided light in the optical waveguide unit 21 are substantially the same. An emission position of the first guided light in the light emission unit 123, an emission position of the second guided light in the light emission unit 123, and an emission position of the third guided light in the light emission unit 123 are substantially the same.

The first guided light, the second guided light, and the third guided light that have reached the light emission unit 123 are emitted to the outside from the light emission unit 123, and project the first image, the second image, and the third image, respectively. As shown in FIGS. 16 and 17, the first guided light, the second guided light, and the third guided light reach the light emission unit 123 through the optical waveguide unit 21 at the same path and angle, and the first image, the second image, and the third image are emitted from the light emission unit 123 at the same angle. Therefore, the first image, the second image, and the third image are projected at the same position on the screen in a superimposed manner, and a color image using red light, green light, and blue light can be projected. As in the present embodiment, by displaying an image with light of a plurality of wavelengths, it is possible to obtain a color psychological effect such as projecting an image of display content indicating a warning in red and projecting an image of display content for giving a calm atmosphere or a refresh feeling in blue or green.

Of the first light LR, the second light LG, and the third light LB diffracted by the diffraction grating unit 10, diffracted light that does not satisfy the total reflection condition in the optical waveguide unit 21 is extracted to the outside from a fourth light emission unit of the optical waveguide unit 21. Since the optical filter 31 is provided in the fourth light emission unit, only the light of the selected wavelength among the first light LR, the second light LG, and the third light LB is transmitted through the optical filter 31 and extracted to the outside. In a case where the optical shutter unit 32 is in a transmission state, the light transmitted through the optical filter 31 is emitted to the outside to project an image. In a case where the optical shutter unit 32 is in a blocking state, the light transmitted through the optical filter 31 is blocked by the optical shutter unit 32, and an image is not projected.

In the example shown in FIG. 16, the optical filter 31 and the optical shutter unit 32 are provided in the fourth light emission unit, and the light emitted to the outside from the fourth light emission unit is selected. However, all of the first light LR, the second light LG, and the third light LB may be emitted from the fourth light emission unit to the outside without providing the optical filter 31 and the optical shutter unit 32. Although FIG. 16 shows an example in which the light emission unit 123 has a flat surface, the light emission unit 123 may be formed in a concave shape or a convex shape to function as a lens, and divergence angles of the first light LR, the second light LG, and the third light LB may be adjusted.

Figure 18A:
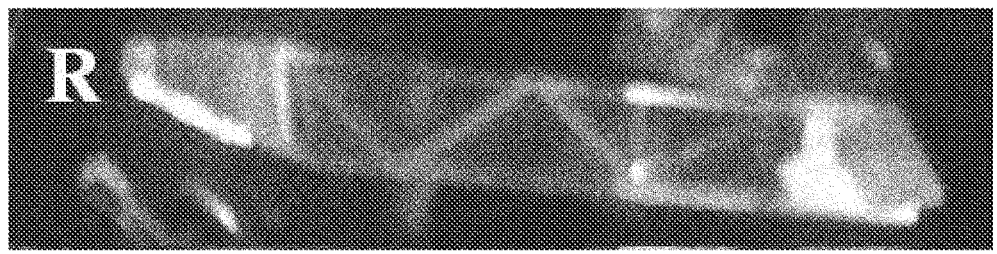
FIG. 18A is a photograph showing a path of light when a laser beam is incident on a light guide plate unit 20, and shows a path of red light.
Figure 18B:
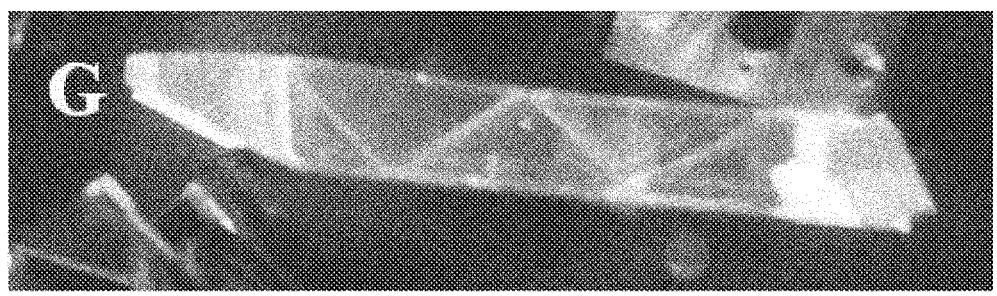
FIG. 18B is a photograph showing a path of light when the laser beam is incident on the light guide plate unit 20, and shows a path of green light.
Figure 18C:
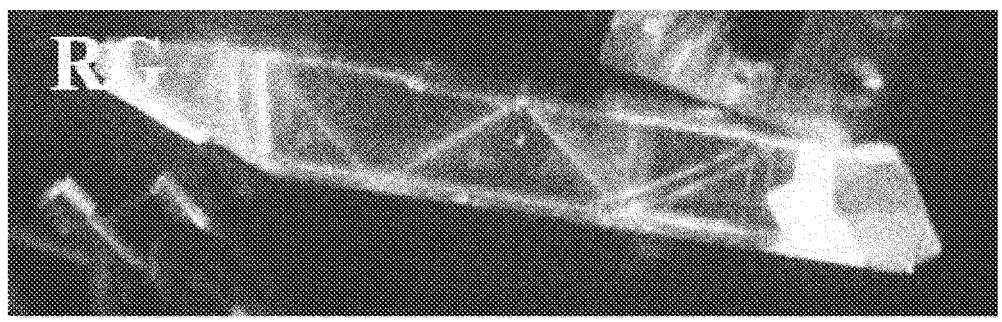
FIG. 18C is a photograph showing a path of light when the laser beam is incident on the light guide plate unit 20, and shows a path when the red light and the green light are simultaneously incident.

FIGS. 18A, 18B, and 18C are photographs showing paths of light when a laser beam is incident on the light guide plate unit 20. FIG. 18A shows a path of red light. FIG. 18B shows a path of green light. FIG. 18C shows a path when red light and green light are simultaneously incident. Bright lines in FIGS. 18A and 18B indicate light paths, and the laser beam reaches the light emission unit 123 from the light incidence unit 22 by repeating total reflection at an interface of the optical waveguide unit 21. As shown in FIG. 18C, incident positions and incident angles of the red light and the green light at the light incidence unit 22 are the same, and paths of the red light and the green light in the optical waveguide unit 21 are also overlapped.

As described above, in the image projection apparatus of the present embodiment, the first light LR, the second light LG, and the third light LB are incident on the diffraction grating unit 10 at different incident angles, and the first light LR, the second light LG, and the third light LB are totally reflected by the optical waveguide unit 21 and guided to the light emission unit 123. Therefore, it is possible to simplify an optical member and reduce the size and weight of the optical member. In addition, since the light emitted from the light emission unit 123 is emitted from the same position at the same angle, the optical axis alignment of the optical member is not necessary even when the light of a plurality of wavelengths is superimposed. However, in a case where a waveguide distance in the optical waveguide unit 21 is long or the optical waveguide unit 21 is formed of a free curved surface, since the emission position of each light in the light emission unit 123 may deviate, an optical path of each light may be adjusted according to the shape or size of light guide plate unit 20. Further, the optical path may be adjusted in consideration of the possibility that the light optically interferes with each other. It is also possible to project various images by emitting the light that does not satisfy the total reflection condition in the optical waveguide unit 21 to the outside from the fourth light emission unit.

Embodiment 10

Figure 19:
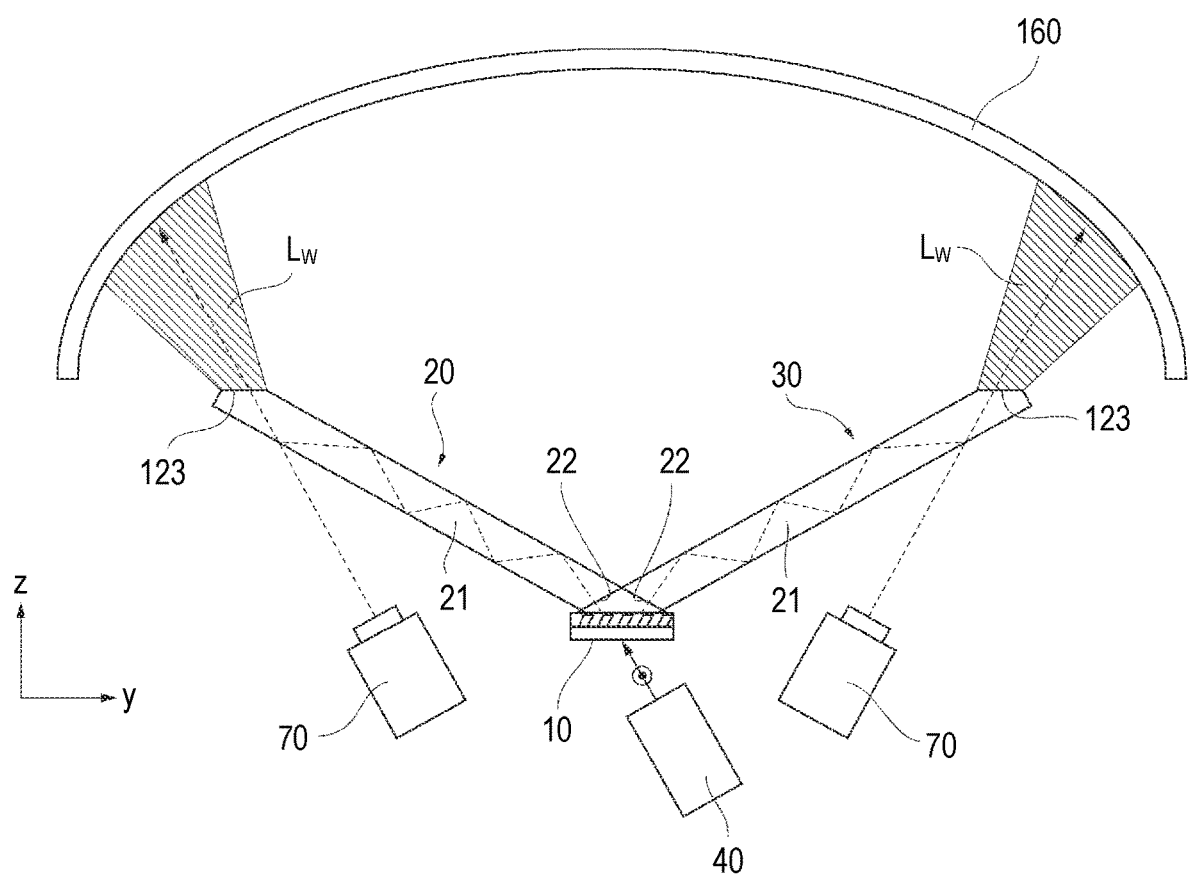
FIG. 19 is a schematic diagram showing a structure of an image projection apparatus according to Embodiment 10.

Next, Embodiment 10 of the present disclosure will be described with reference to FIG. 19. Description of contents overlapping with Embodiment 9 will be omitted. FIG. 19 is a schematic diagram showing a structure of an image projection apparatus according to the present embodiment. Solid-line arrows and dashed-line arrows shown in FIG. 19 schematically indicate paths of light. In FIG. 19, a region hatched with diagonal lines indicates a region irradiated with irradiation light LW. In the present embodiment, two light guide plate units 20 are provided, and a common diffraction grating unit 10 is arranged to face the light incidence units 22 provided in the respective light guide plate units 20.

As shown in FIG. 19, the image projection apparatus includes one diffraction grating unit 10, two light guide plate units 20, the image irradiation unit 40, and the external screen 160. A viewer wearing the image projection apparatus views the light guide plate units and a direction of the external screen 160 with both eyes from positions of two viewpoints 70. As shown in FIG. 1, the diffraction grating unit 10 is an optical element including the flat-plate portion 11, the convex portions 12, the concave portions 13, and the covering portion, and is formed separately from the light guide plate unit 20. Each of the light guide plate units is a plate-shaped member made of a translucent material, and includes the optical waveguide unit 21, the light incidence unit 22, and the light emission unit 123.

The external screen 160 displays an image by projecting the light emitted from the light guide plate unit 20. A material constituting the external screen 160 is not limited, and a translucent material that transmits light may be used, or a white material that blocks and reflects light may be used. In a case where a translucent material is used, images can be projected in a superimposed manner with an external environment of the image projection apparatus as a background. In the example shown in FIG. 19, the external screen 160 is provided separately from the image projection apparatus, but the external screen 160 may be formed integrally with an arm portion, and the arm portion may be fixed to the light guide plate unit 20 to maintain a relative positional relationship between the external screen 160 and the light guide plate unit 20.

The light incidence units 22 of the two light guide plate units 20 are arranged adjacent to each other, and the common diffraction grating unit 10 is arranged across the two light incidence units 22 so as to face the two light incidence units 22. Each of the two light guide plate units 20 has a flat plate shape and is arranged in a V-shape. In FIG. 19, the image irradiation units 40a, 40b, and 40c of Embodiment 9 are collectively shown as the image irradiation unit 40, but the diffraction grating unit 10 is irradiated with the first light LR, the second light LG, and the third light LB having a plurality of wavelengths at different incident angles. In the present embodiment, the plurality of image irradiation units included in the image irradiation unit 40 correspond to the third image irradiation unit and the fourth image irradiation unit in the present disclosure, respectively.

Similarly to Embodiment 9, the first light LR, the second light LG, and the third light LB are incident on the diffraction grating unit 10 from the image irradiation unit 40, and the diffracted light of the first light LR, the second light LG, and the third light LB diffracted by the diffraction grating unit 10 are incident on the optical waveguide unit 21 from the light incidence units 22 of the respective light guide plate units 20.

As shown in FIG. 1, in the diffraction grating unit 10, the first light is diffracted by the uneven portion constituted by the convex portions 12 and the concave portions 13, the 0th-order light T1 and the +1st-order light I1 travel rightward in the figure, and the −1st-order light T2 and the −2nd-order light I2 travel leftward in the figure. Therefore, the 0th-order light T1 and the +1st-order light I1 are incident on the optical waveguide unit 21 arranged to face the right half of the diffraction grating unit 10, and the −1st-order light T2 and the −2nd-order light I2 are incident on the optical waveguide unit 21 arranged to face the left half of the diffraction grating unit 10.

In the example shown in FIG. 19, by designing an inclination angle of the light incidence unit 22 and a shape of the optical waveguide unit 21 so that the 0th-order light T1 satisfies a total reflection condition of the optical waveguide unit 21 arranged on the right side, the 0th-order light T1 is guided as guided light. Similarly, by designing the inclination angle of the light incidence unit 22 and the shape of the optical waveguide unit 21 so that the −1st-order light T2 satisfies a total reflection condition of the optical waveguide unit 21 arranged on the left side, the −1st-order light T2 is guided as guided light.

The first guided light, the second guided light, and the third guided light guided through the two light guide plate units 20 are emitted as the irradiation light LW from the respective light emission units 123, and a projection image is displayed by superimposing the first image, the second image, and the third image on the external screen 160.

As described above, in the image projection apparatus of the present embodiment, since the diffraction grating unit 10 common to the two light guide plate units 20 is provided, the projection image can be visually recognized by both eyes of the viewer. In addition, also in the image projection apparatus of the present embodiment, it is possible to simplify an optical member and reduce the size and weight of the optical member.

Modification of Embodiment 10

Figure 20:
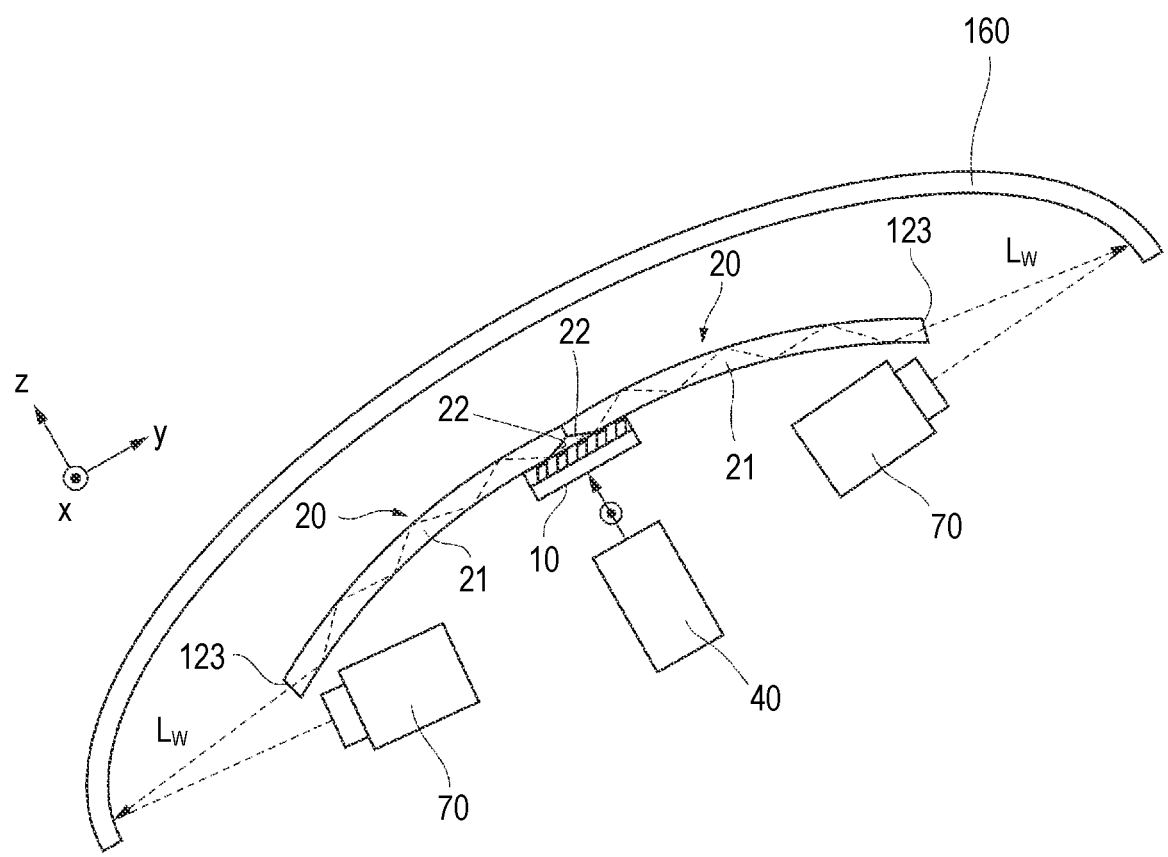
FIG. 20 is a schematic diagram showing a structure of an image projection apparatus according to a modification of Embodiment 10.

Next, a modification of Embodiment 10 of the present disclosure will be described with reference to FIG. 20. Description of contents overlapping with Embodiment 9 will be omitted. FIG. 20 is a schematic diagram showing a structure of an image projection apparatus according to a modification of Embodiment 10. Solid-line arrows and dashed-line arrows shown in FIG. 20 schematically indicate paths of light. The present modification is different from Embodiment 10 in that each of the two light guide plate units 20 has a curved shape.

In the example shown in FIG. 20, by designing an inclination angle of the light incidence unit 22 and a shape of the optical waveguide unit 21 so that the +1st-order light I1 satisfies a total reflection condition of the optical waveguide unit 21 arranged on the right side, the +1st-order light I1 is guided as guided light. Similarly, by designing the inclination angle of the light incidence unit 22 and the shape of the optical waveguide unit 21 so that the −2nd-order light I2 satisfies a total reflection condition of the optical waveguide unit 21 arranged on the left side, the −2nd-order light I2 is guided as guided light.

In the example shown in FIG. 20, the two light guide plate units 20 each have a curved shape along the direction of the viewpoint 70. However, since the incident angle of the first light from the diffraction grating unit 10 to the light incidence unit 22 is determined by the diffraction condition, the light guide plate units 20 can be designed so as to repeat total reflection along curved surfaces thereof. In addition, in FIG. 20, the left and right light guide plate units 20 are drawn in a shape close to a line object, but the inclination angle or the like of the light incidence unit 22 may be different between the left and right depending on which one of the first light LR, the second light LG, and the third light LB diffracted by the diffraction grating unit 10 is used as the guided light.

Also in the present modification, as in Embodiment 10, it is possible to view the projection image displayed on the external screen 160 in a superimposed manner from the positions of the two viewpoints 70.

Embodiment 11

Figure 21:
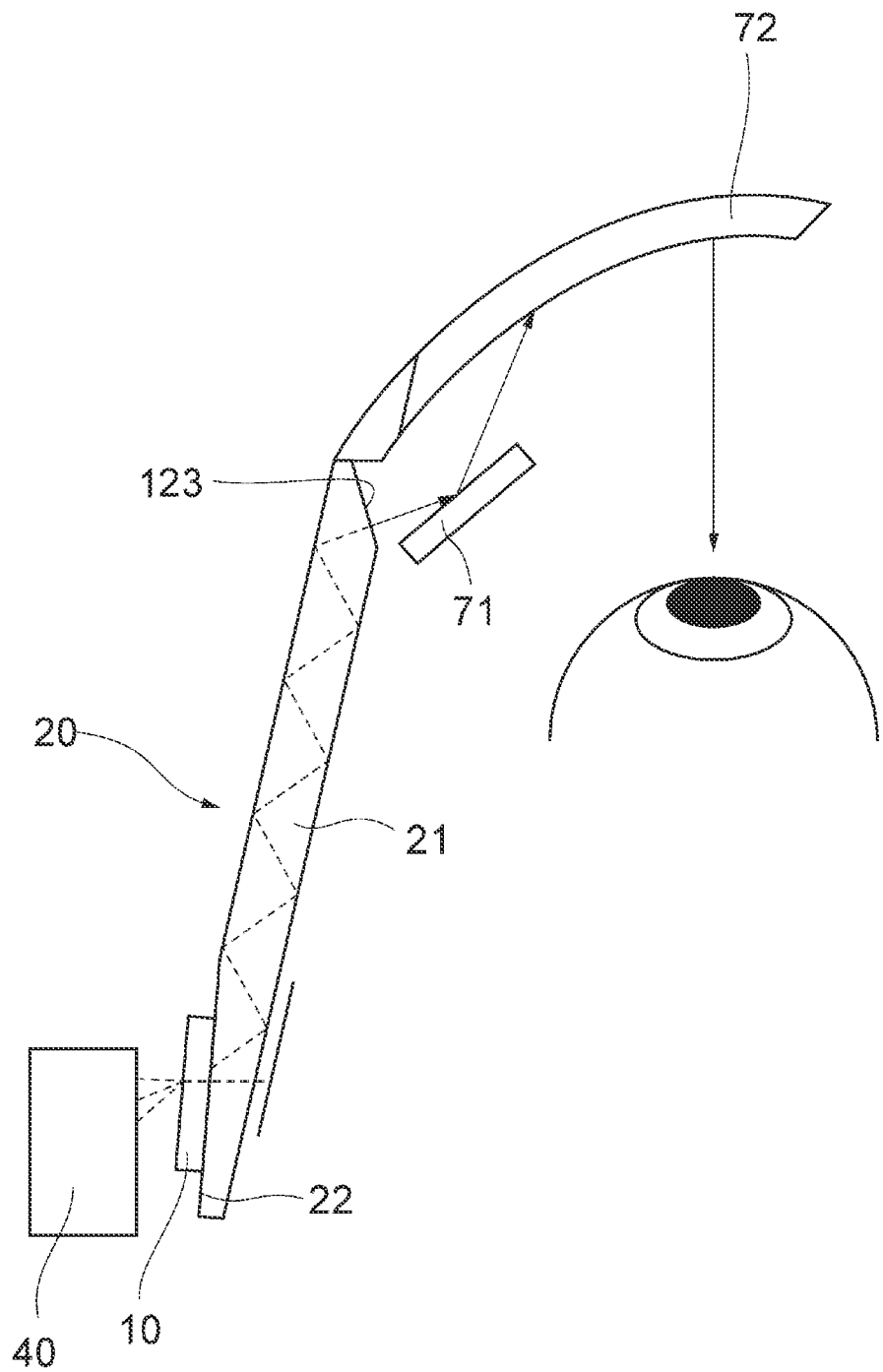
FIG. 21 is a schematic diagram showing a structure of an image projection apparatus according to Embodiment 11.

Next, Embodiment 11 of the present disclosure will be described with reference to FIG. 21. Description of contents overlapping with Embodiment 9 will be omitted. FIG. 21 is a schematic diagram showing a structure of an image projection apparatus according to the present embodiment. Solid-line arrows and dashed-line arrows shown in FIG. 21 schematically indicate paths of light. As shown in FIG. 21, the image projection apparatus of the present embodiment includes the diffraction grating unit 10, the light guide plate unit 20, the image irradiation unit 40, a digital mirror device 71, and a reflection mirror unit 72. A viewer wearing the image projection apparatus views a direction of the reflection mirror unit 72 from a viewpoint position. The image projection apparatus of the present embodiment is a wearable HUD having a shape of glasses. The light guide plate unit 20 is used as a temple of glasses, and the reflection mirror unit 72 is used as a lens. Although only the left half is shown in FIG. 21, an image can be projected to both eyes by providing the same structure symmetrically.

The digital mirror device 71 includes a plurality of minute mirrors, and the minute mirrors are members that can individually change reflection angles, and reflect light including an image by controlling the minute mirrors based on image information. The reflection mirror unit 72 is a member that guides light including an image reflected by the digital mirror device 71 and reflects the light in the viewpoint direction. Although FIG. 21 shows a part of the lens of the glasses as the reflection mirror unit 72, the shape and the position are not limited as long as the light from the digital mirror device 71 can be reflected to the viewpoint.

The image irradiation unit 40 includes laser light sources that emit the first light LR, the second light LG, and the third light LB, and causes the light to enter the diffraction grating unit 10 at different incident angles. In the example shown in FIG. 21, the digital mirror device 71 serving as an image forming unit is provided separately from the image irradiation unit 40, and the image is included in the light emitted from the light guide plate unit 20. However, the image forming unit may be provided in the image irradiation unit 40. In the present embodiment, a plurality of laser light sources included in the image irradiation unit 40 correspond to the third image irradiation unit and the fourth image irradiation unit in the present disclosure, respectively.

Also in the present embodiment, the first light LR, the second light LG, and the third light LB emitted from the image irradiation unit 40 are incident on the diffraction grating unit 10 at different incident angles, and a part of the diffracted light is incident on the optical waveguide unit 21 from the same position of the light incidence unit 22 at the same angle. The diffracted light of the first light LR, the second light LG, and the third light LB satisfies the total reflection condition of the optical waveguide unit 21, and reaches the light emission unit 123 by repeating total reflection in the optical waveguide unit 21. The guided light that has reached the light emission unit 123 is emitted from the light guide plate unit 20 and reflected by the digital mirror device 71. At this time, the reflection angles of the minute mirrors included in the digital mirror device 71 are controlled based on the image information, and the image is included in the light reflected by the digital mirror device 71. The light reflected by the digital mirror device 71 is reflected again in the viewpoint direction by the reflection mirror unit 72, and the image is projected to the viewpoint.

As shown in FIGS. 16 and 17, since the first light LR, the second light LG, and the third light LB are totally reflected in the light guide plate unit 20 at the same position and the same angle, the irradiation light emitted from the light emission unit 123 is reflected by the digital mirror device 71 and the reflection mirror unit 72 and has the same path to reach the viewpoint. Therefore, the first image, the second image, and the third image included in the first light LR, the second light LG, and the third light LB are incident on the viewpoint in a superimposed manner, and a color image can be viewed. By using time-division driving for the image display by the digital mirror device 71, the light irradiation of each color and the timing of the image formation can be synchronized, and contents of the first image, the second image, and the third image can be made different from each other. In addition, by using pulse width modulation (PWM) for driving the digital mirror device 71 and the image irradiation unit 40, it is also possible to perform gradation display with light of each color.

As described above, also in the image projection apparatus of the present embodiment, the first light LR, the second light LG, and the third light LB are incident on the diffraction grating unit 10 at different incident angles, and the first light LR, the second light LG, and the third light LB are totally reflected by the optical waveguide unit 21 and guided to the light emission unit 123. Therefore, it is possible to simplify an optical member and reduce the size and weight of the optical member. In addition, since the light emitted from the light emission unit 123 is emitted from the same position at the same angle, the optical axis alignment of the optical member is not necessary even when the light of a plurality of wavelengths is superimposed.

Embodiment 12

Figure 22:
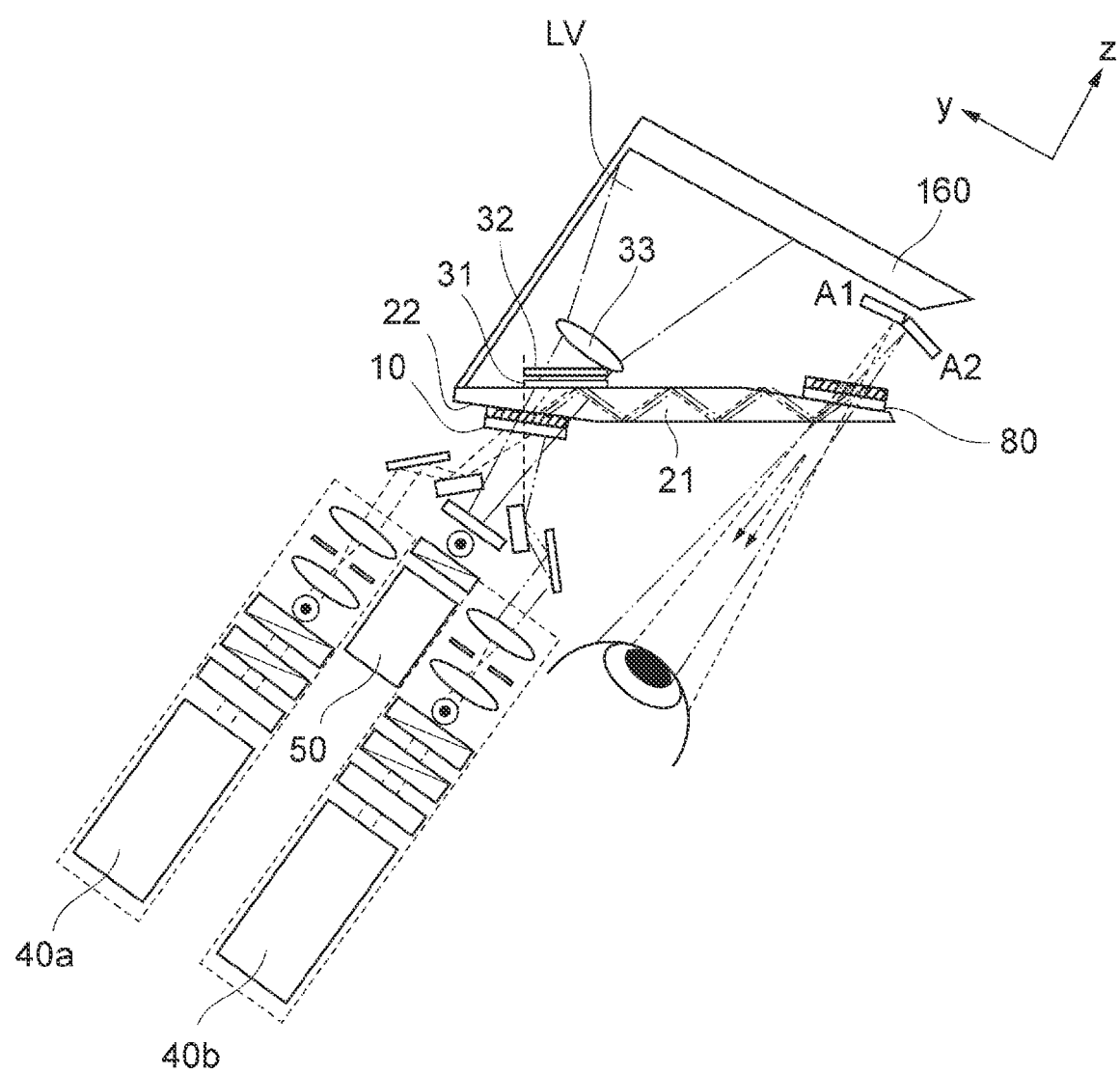
FIG. 22 is a schematic diagram showing a structure of an image projection apparatus according to Embodiment 12.

Next, Embodiment 12 of the present disclosure will be described with reference to FIGS. 22 and 23. Description of contents overlapping with Embodiment 9 will be omitted. FIG. 22 is a schematic diagram showing a structure of an image projection apparatus according to the present embodiment. As shown in FIG. 22, the image projection apparatus includes the diffraction grating unit 10, the light guide plate unit 20, the image irradiation units 40a and 40b, the image irradiation unit 50, the external screen 160, and a diffraction grating unit 80. A viewer wearing the image projection apparatus views the light guide plate unit 20 and a direction of the external screen 160 from a position of a viewpoint. The diffraction grating unit 80 corresponds to a second diffraction grating unit in the present disclosure.

As shown in FIG. 1, each of the diffraction grating units 10 and 80 is an optical element including the flat-plate portion 11, the convex portions 12, the concave portions 13, and the covering portion, and is formed separately from the light guide plate unit 20. The light guide plate unit 20 is a plate-shaped member made of a translucent material, and includes the optical waveguide unit 21, the light incidence unit 22, the light emission unit 123, the optical filter 31, the optical shutter unit 32, and a projection lens 33.

The image irradiation unit 50 is a device that irradiates the diffraction grating unit with light for projecting an image, and is provided as a separate structure from the image irradiation units 40a and 40b. The first light and the second light emitted by the image irradiation units 40a and 40b and the third light emitted by the image irradiation unit 50 have different wavelengths. For example, the first light is red light, the second light is blue light, and the third light is green light. In the third light emitted by the image irradiation unit 50, the diffracted light diffracted by the diffraction grating unit 10 does not satisfy the total reflection condition of the light guide plate unit 20. Of the first light and the second light emitted by the image irradiation units 40a and 40b, a part of the light diffracted by the diffraction grating unit satisfies the total reflection condition of the light guide plate unit 20.

The third light emitted from the image irradiation unit 50 is diffracted by the diffraction grating unit 10 and transmitted through the optical waveguide unit 21, is emitted as the irradiation light LV to the external screen 160, and projects a projection image on the external screen 160. The projection lens 33 is an optical member for increasing the light diameter of the irradiation light LV extracted from the second light emission unit and projecting the irradiation light LV onto the external screen 160. Although FIG. 22 shows one lens as the projection lens 33, the projection lens 33 may be configured by combining a plurality of lenses. Although FIG. 22 shows a state in which the irradiation light LV emitted from the image irradiation unit 50 is projected on the left half of the external screen 160, it is possible to irradiate the entire external screen 160 with the irradiation light LV and project the image on the entire external screen 160 so as to cover the entire field of view by using a separate optical member such as a lens.

Figure 23:
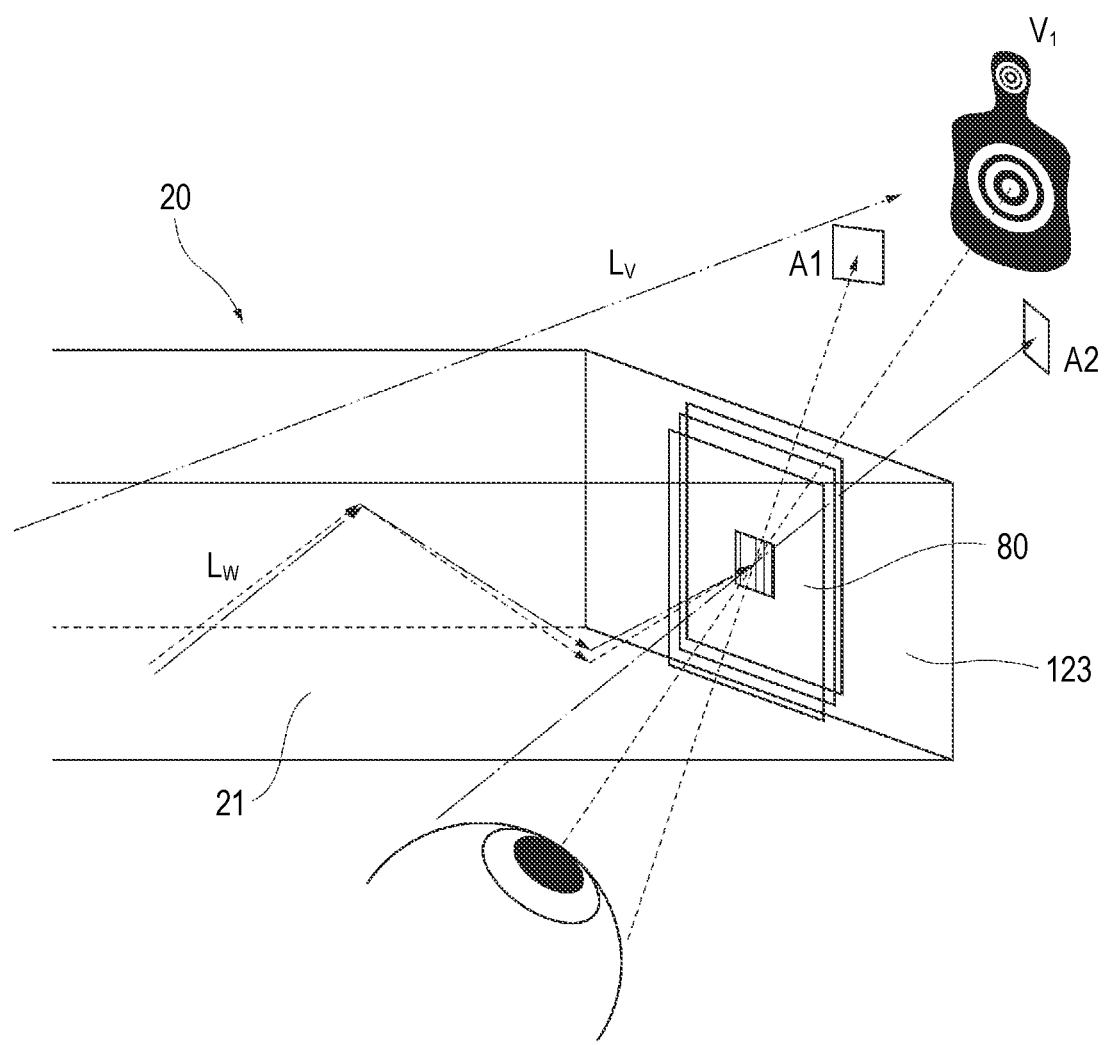
FIG. 23 is an enlarged schematic perspective view showing a light emission unit 123 of the image projection apparatus according to Embodiment 12.

FIG. 23 is an enlarged schematic perspective view showing the light emission unit 123 of the image projection apparatus according to the present embodiment. The diffraction grating unit 80 is arranged in the light emission unit 123, and is an optical member that opens the guided light emitted from the light emission unit 123 and extracts the guided light to the outside. In the examples shown in FIGS. 22 and 23, the shapes of the convex portion 12 and the concave portion 13 of the diffraction grating unit 80 are the same as those of the diffraction grating unit 10, and the uneven portions of the diffraction grating unit 10 and the diffraction grating unit 80 are arranged so as to be parallel to each other. In the diffraction grating unit 10, the convex portion 12 and the concave portion 13 are arranged to face the light incidence unit 22, but in the diffraction grating unit 80, the flat-plate portion 11 is arranged to face the light emission unit 123.

The first light and the second light incident on the optical waveguide unit 21 are totally reflected at the same position in the optical waveguide unit 21 at the same angle and reach the light emission unit 123. The light emission unit 123 is provided with the diffraction grating unit 80, and the first light and the second light are diffracted by the diffraction grating unit 80 and extracted in the viewpoint direction as third emitted diffracted light and fourth emitted diffracted light at different diffraction angles. At this time, the guided light propagated in the optical waveguide unit 21 is diffracted by the diffraction grating unit 80, and is extracted in the viewpoint direction as the imaging light while the light diameter is increased. Therefore, the diffracted light of the first light and the diffracted light of the second light diffracted by the diffraction grating unit 80 travel while increasing the light diameter until reaching the viewpoint. Accordingly, at the viewpoint, it is viewed that the aerial images A1 and A2 are formed in a space between the diffraction grating unit 80 and the external screen 160. Here, planes constituting the aerial images A1 and A2 are inclined and non-parallel to each other according to angles of first emitted diffracted light and second emitted diffracted light as shown in FIG. 22. The aerial images A1 and A2 are formed circumferentially around the diffraction grating unit 80, and a plurality of aerial images A1 and A2 can be arranged and displayed in a dome shape.

In addition, by ensuring a distance between the external screen 160 and the diffraction grating unit 80, it is possible to simultaneously view the image V1 projected on the external screen 160 by the irradiation light LV from the second light emission unit and the aerial images A1 and A2 formed by the imaging light L1 and L2. In the examples shown in FIGS. 22 and 23, the diffraction grating unit 10 and the diffraction grating unit 80 have the same structure, but the structure of the diffraction grating unit 80 may be different from that of the diffraction grating unit 10, and imaging directions and imaging positions of the aerial images A1 and A2 may be set to appropriate positions.

In the image projection apparatus of the present embodiment, a part of the first light and a part of the second light are diffracted by the diffraction grating unit 80 provided in the light emission unit 123, and are emitted in the viewpoint direction at different emission angles as the third emitted diffracted light and the fourth emitted diffracted light. Accordingly, the aerial images A1 and A2 can be formed at different angles and positions by the third emitted diffracted light and the fourth emitted diffracted light. Further, it is also possible to project the third light from the image irradiation unit 50 onto the external screen 160 from the fourth light emission unit to cause the image V1 and the aerial images A1 and A2 to be viewed in a superimposed manner.

As described above, also in the image projection apparatus of the present embodiment, the first light and the second light are incident on the diffraction grating unit 10 at different incident angles, and the first light and the second light are totally reflected by the optical waveguide unit 21 and guided to the light emission unit 123. Therefore, it is possible to simplify an optical member and reduce the size and weight of the optical member.

Embodiment 13

Figure 24:
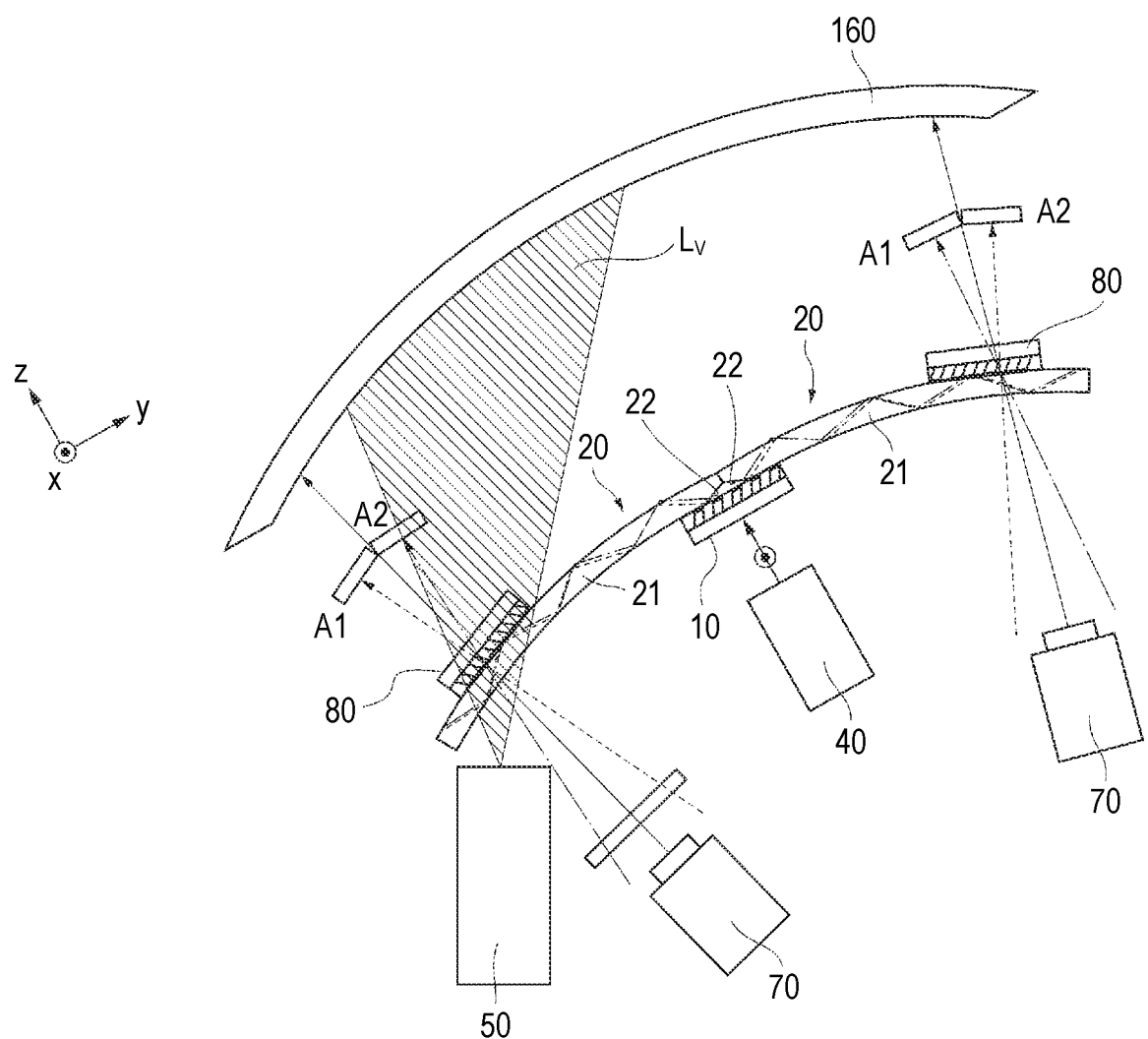
FIG. 24 is a schematic diagram showing a structure of an image projection apparatus according to Embodiment 13.

Next, Embodiment 13 of the present disclosure will be described with reference to FIG. 24. Description of contents overlapping with Embodiment 9 will be omitted. FIG. 24 is a schematic diagram showing a structure of an image projection apparatus according to the present embodiment. Solid-line arrows and dashed-line arrows shown in FIG. 24 schematically indicate paths of light. In FIG. 24, a region hatched with diagonal lines indicates a region irradiated with the irradiation light LV. In the present embodiment, two light guide plate units 20 having a curved shape are provided, and a common diffraction grating unit 10 is arranged to face the light incidence units 22 provided in the respective light guide plate units 20.

As shown in FIG. 24, the image projection apparatus includes one diffraction grating unit 10, two light guide plate units 20, the image irradiation unit 40, the image irradiation unit 50, the external screen 160, and the diffraction grating unit 80. A viewer wearing the image projection apparatus views the light guide plate units 20 and a direction of the external screen 160 with both eyes from positions of two viewpoints 70.

In the example shown in FIG. 24, by designing an inclination angle of the light incidence unit 22 and a shape of the optical waveguide unit 21 so that the +1st-order light I1 satisfies a total reflection condition of the optical waveguide unit 21 arranged on the right side, the +1st-order light I1 is guided as guided light. Similarly, by designing the inclination angle of the light incidence unit 22 and the shape of the optical waveguide unit 21 so that the −2nd-order light 12 satisfies a total reflection condition of the optical waveguide unit 21 arranged on the left side, the −2nd-order light 12 is guided as guided light.

The first light and the second light guided in the two light guide plate units 20 are diffracted by the diffraction grating unit 80 provided in each of the light emission units 123, and are emitted in the viewpoint direction as the third emitted diffracted light and the fourth emitted diffracted light to form the aerial images A1 and A2. The third light emitted from the image irradiation unit 50 is emitted as the irradiation light LV to the external screen 160 to project an image.

As described above, in the image projection apparatus of the present embodiment, since the diffraction grating unit 10 common to the two light guide plate units 20 is provided and the diffraction grating unit 80 is provided in the light emission unit 123, the aerial images A1 and A2 can be viewed by both eyes of the viewer. In addition, also in the image projection apparatus of the present embodiment, it is possible to simplify an optical member and reduce the size and weight of the optical member.

Modification of Embodiment 13

Figure 25:
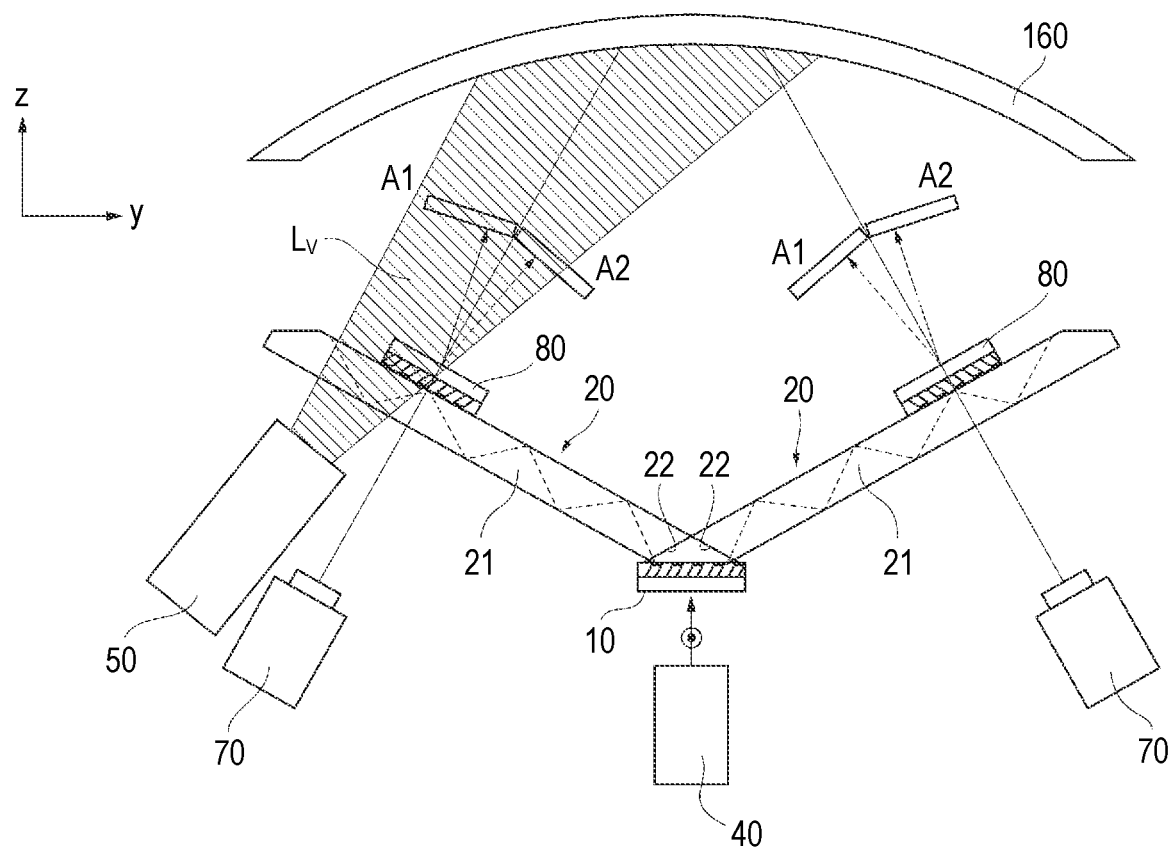
FIG. 25 is a schematic diagram showing a structure of an image projection apparatus according to a modification of Embodiment 13.

Next, a modification of Embodiment 13 of the present disclosure will be described with reference to FIG. 25. Description of contents overlapping with Embodiment 9 will be omitted. FIG. 25 is a schematic diagram showing a structure of an image projection apparatus according to a modification of Embodiment 13. Solid-line arrows and dashed-line arrows shown in FIG. 25 schematically indicate paths of light. In FIG. 25, a region hatched with diagonal lines indicates a region irradiated with the irradiation light LV. In the present embodiment, two light guide plate units 20 having a flat plate shape are provided, and a common diffraction grating unit 10 is arranged to face the light incidence units 22 provided in the respective light guide plate units 20.

As shown in FIG. 25, the image projection apparatus includes one diffraction grating unit 10, two light guide plate units 20, the image irradiation unit 40, the image irradiation unit 50, the external screen 160, and the diffraction grating unit 80. A viewer wearing the image projection apparatus views the light guide plate units 20 and a direction of the external screen 160 with both eyes from positions of two viewpoints 70.

In the example shown in FIG. 25, by designing an inclination angle of the light incidence unit 22 and a shape of the optical waveguide unit 21 so that the 0th-order light T1 satisfies a total reflection condition of the optical waveguide unit 21 arranged on the right side, the 0th-order light T1 is guided as guided light. Similarly, by designing the inclination angle of the light incidence unit 22 and the shape of the optical waveguide unit 21 so that the −1st-order light T2 satisfies a total reflection condition of the optical waveguide unit 21 arranged on the left side, the −1st-order light T2 is guided as guided light.

The first light and the second light guided in the two light guide plate units 20 are diffracted by the diffraction grating unit 80 provided in each of the light emission units 123, and are emitted in the viewpoint direction as the first emitted diffracted light and the second emitted diffracted light to form the aerial images A1 and A2. The third light emitted from the image irradiation unit 50 is emitted as the irradiation light LV to the external screen 160 to project an image.

Also in the present modification, as in Embodiment 13, in the image projection apparatus of the present embodiment, since the diffraction grating unit 10 common to the two light guide plate units 20 is provided and the diffraction grating unit 80 is provided in the light emission unit 123, the aerial images A1 and A2 can be viewed by both eyes of the viewer. In addition, also in the image projection apparatus of the present embodiment, it is possible to simplify an optical member and reduce the size and weight of the optical member.

Embodiment 14

Figure 26A:
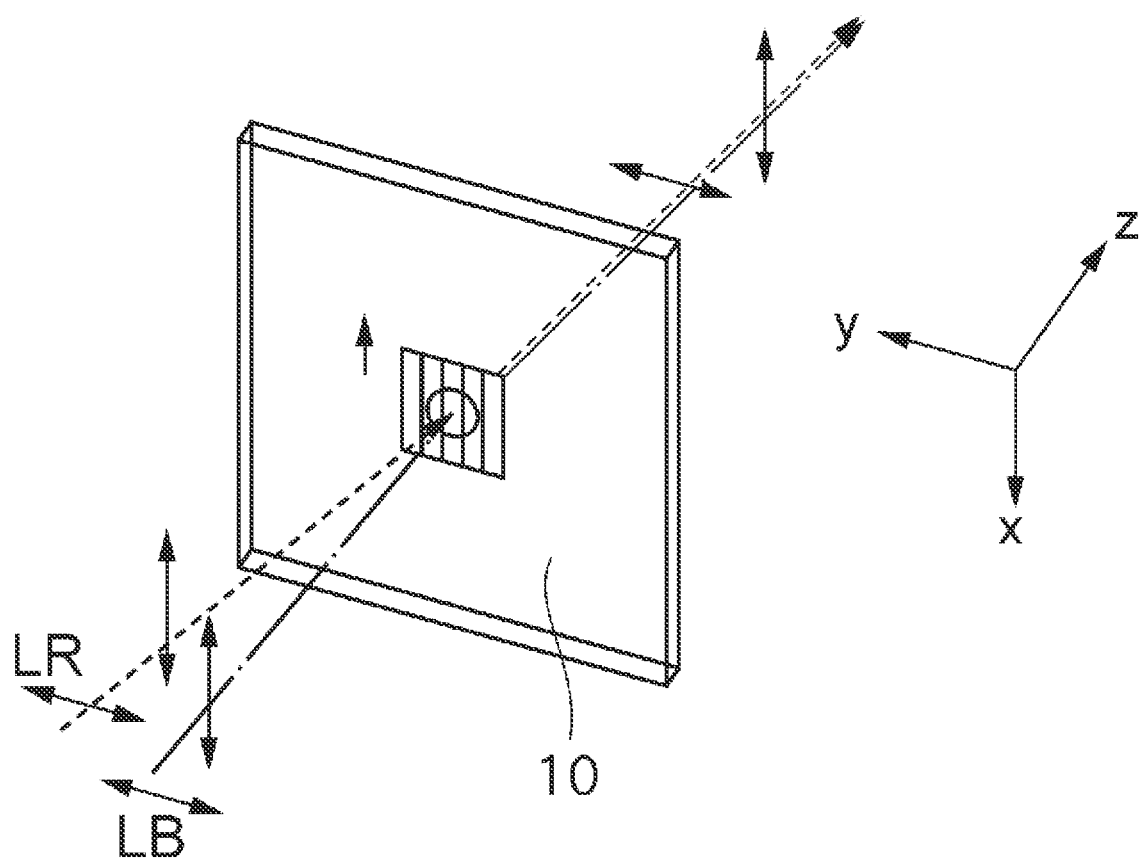
FIG. 26A is a schematic perspective view showing an arrangement of a diffraction grating unit 10 and a diffraction grating unit 80 in Embodiment 14, and shows the diffraction grating unit 10.
Figure 26B:
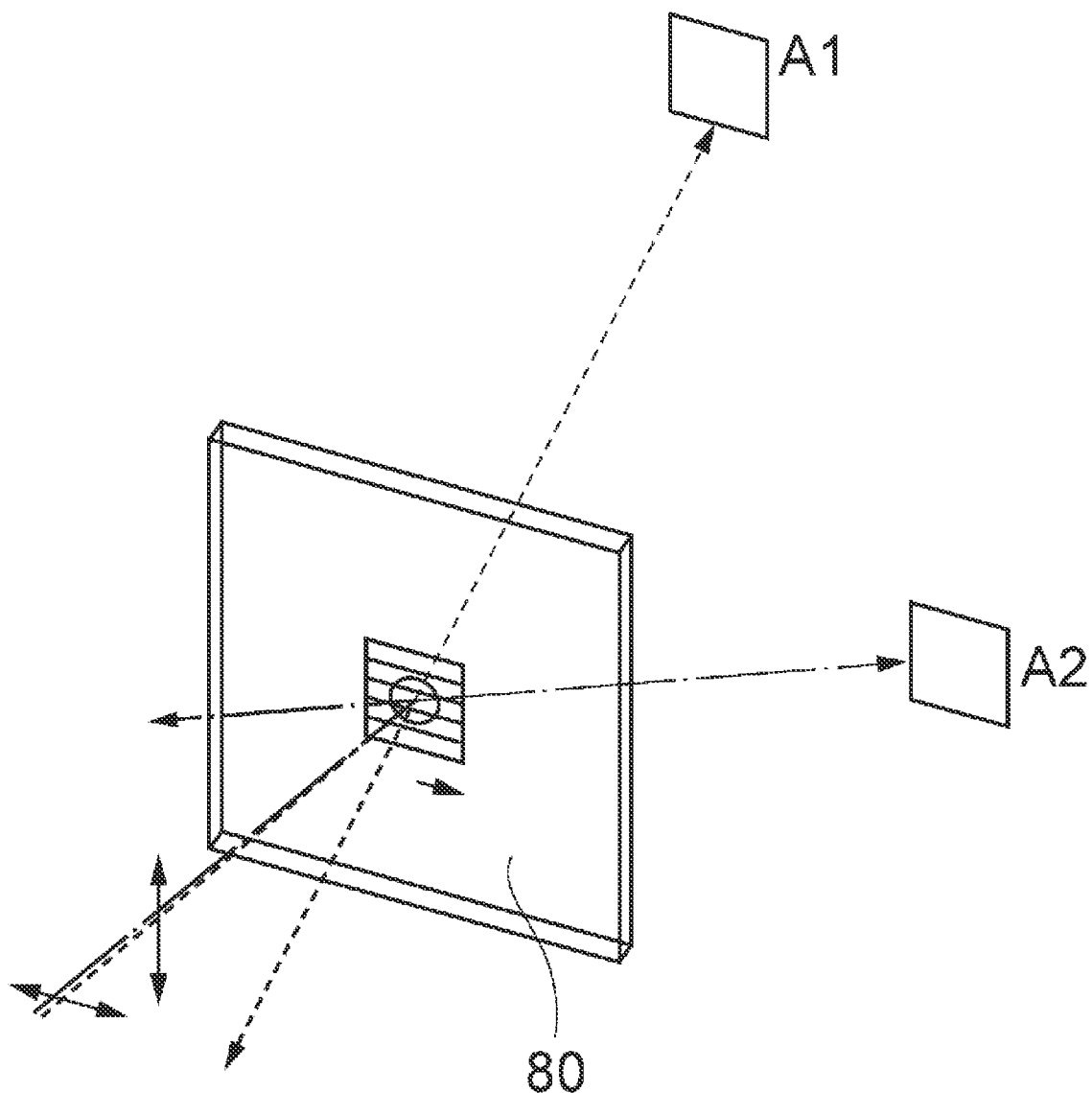
FIG. 26B is a schematic perspective view showing the arrangement of the diffraction grating unit 10 and the diffraction grating unit 80 in Embodiment 14, and shows the diffraction grating unit 80.
Figure 27:
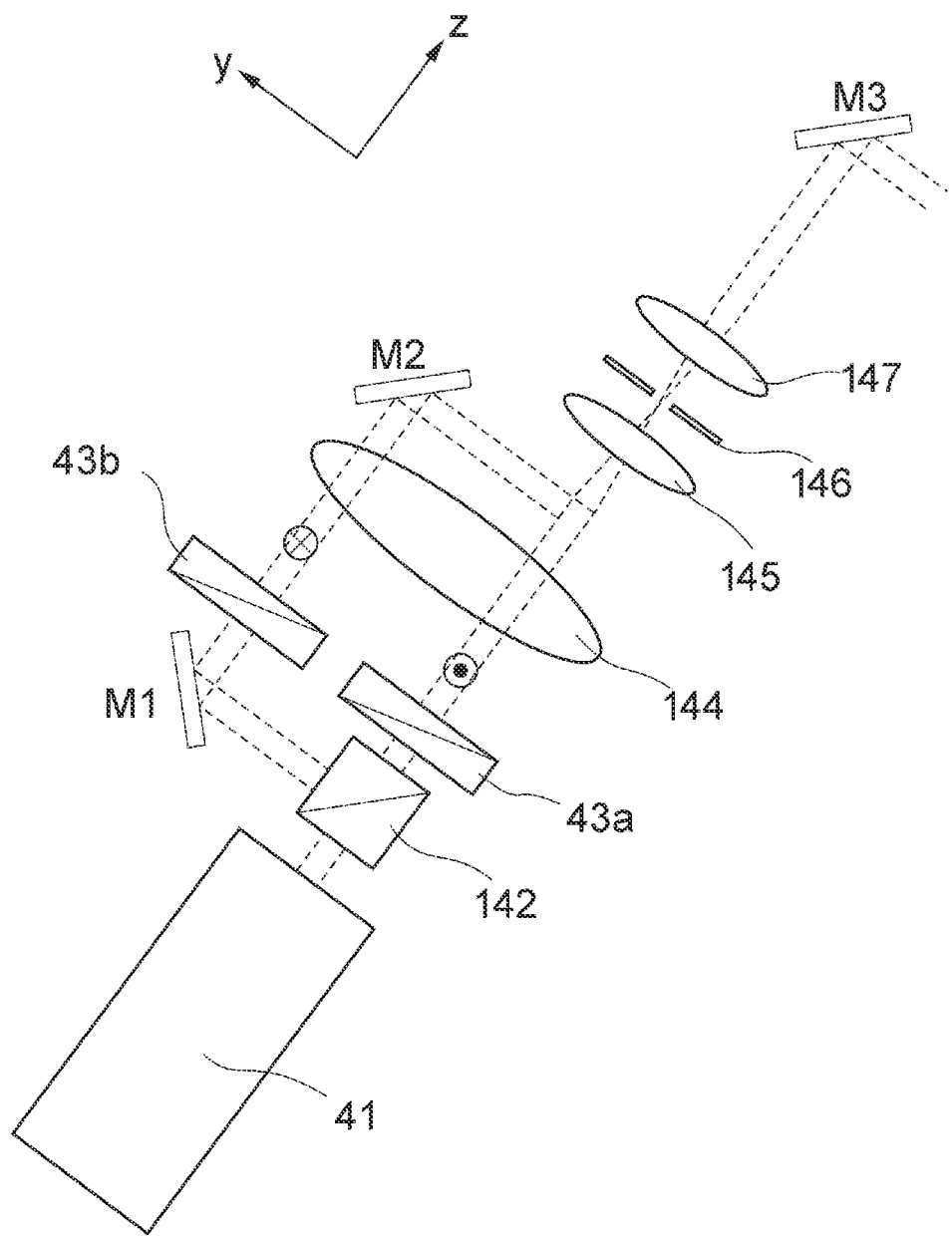
FIG. 27 is a schematic diagram showing a structure example of an image irradiation unit 40 of the image projection apparatus according to Embodiment 14.

Next, Embodiment 14 of the present disclosure will be described with reference to FIGS. 26A and 26B. The present embodiment is different from Embodiment 12 in the arrangement of the diffraction grating unit 80, and the description of contents overlapping with Embodiment 12 is omitted. FIGS. 26A and 26B are schematic perspective views showing an arrangement of the diffraction grating unit 10 and the diffraction grating unit 80 in the embodiment. FIG. 26A shows the diffraction grating unit 10. FIG. 26B shows the diffraction grating unit 80. FIG. 27 is a schematic diagram showing a structure example of the image irradiation unit 40 of the image projection apparatus according to the present embodiment.

As shown in FIGS. 26A and 26B, the uneven portion of the diffraction grating unit extends along the x-axis direction (vertical direction in the figure), and the uneven portion of the diffraction grating unit 80 extends along the y-axis direction (horizontal direction in the figure). The uneven portions are arranged so as to be orthogonal to each other.

The first light LR and the second light LB incident on the diffraction grating unit 10 have different angles with respect to a z axis in a yz plane, and are incident on the diffraction grating unit 10 at different incident angles. As described in Embodiment 9, the diffracted light of the first light LR and the second light LB in the diffraction grating unit 10 are in the same direction, and the first light LR and the second light LB are totally reflected and propagated along the same path in the optical waveguide unit 21.

The guided light of the first light LR and the second light LB propagated in the optical waveguide unit 21 is incident at the same angle at the same position of the diffraction grating unit 80 provided in the light emission unit 123. Since a response portion of the diffraction grating unit 80 extends along the y-axis direction, the first light LR and the second light LB diffracted by the diffraction grating unit 80 are separated in an xz plane, travel in the viewpoint direction, and form the aerial images A1 and A2 separated in the vertical direction.

As shown in FIG. 27, the image irradiation unit 40 includes the light source unit 41, a second beam splitter 142, polarizers 43a and 43b, a chopper 144, lenses 145 and 147, an aperture 146, and mirrors M1, M2, and M3. A laser light source is preferably used as the light source unit 41.

The laser beam emitted from the light source unit 41 is split by the second beam splitter 142, one of which is incident on the polarizer 43a and the other is reflected by the mirror M1 and incident on the polarizer 43b, and change directions are adjusted to be orthogonal to each other. The laser beam incident on the polarizer 43a and the polarizer 43b passes through the chopper 144. By passing the laser beam through the chopper 144, when one laser beam passes, the other laser beam is blocked, and the light is switched on/off complementarily. That is, a polarization direction of each laser beam is maintained even after the laser beam passes through the chopper 144. Thereafter, two laser beams are coaxially superimposed on each other by a multiplexing unit, the light diameter and the divergence angle are adjusted through the lens 145, the aperture 146, and the lens 147, and the laser beams are reflected by the mirror M3 and emitted to the outside.

As described above, in the image projection apparatus of the present embodiment, by arranging the uneven portions of the diffraction grating unit 10 and the diffraction grating unit 80 to be orthogonal to each other, the aerial images A1 and A2 can be vertically divided and formed.

Embodiment 15

Next, Embodiment 15 of the present disclosure will be described. Description of contents overlapping with Embodiment 9 will be omitted. In Embodiments 9 to 14, $TiO_2$ and $SiO_2$ are used as the materials for forming the diffraction grating units 10 and 80, but a wavelength conversion element such as a second harmonic generation (SHG) may be configured using a nonlinear optical crystal. Examples of a material of the nonlinear optical crystal include KTP crystal, LBO crystal, and CLBO crystal.

By using the nonlinear optical crystal for the diffraction grating units 10 and 80, it is also possible to adjust the incident angle and phase of the laser beam to perform wavelength conversion and make a wavelength of the emitted light variable.

The present disclosure is not limited to the embodiments described above, various modifications can be made within the scope shown in the claims, and embodiments obtained by appropriately combining the technical means disclosed in different embodiments are also included in the technical scope of the present disclosure.

The present application claims the priority of Japanese Patent Application No. 2021-028219 filed on Feb. 25, 2021 and Japanese Patent Application No. 2021-028221 filed on Feb. 25, 2021, and incorporates all the description contents described in the Japanese patent applications.

The invention claimed is:

1. An image projection apparatus comprising:
    a first image irradiation unit configured to emit first light;
    a light guide plate unit including:
        a first light incidence unit on which the first light is incident,
        an optical waveguide unit configured to guide a part of the first light as guided light while totally reflecting the part of the first light, and
        a first light emission unit configured to emit a part of the guided light in a viewpoint direction; and
    a diffraction grating unit provided in the first light incidence unit,
    wherein the first light emission unit includes a beam splitter provided in the optical waveguide unit and a retroreflection unit provided at an end of the optical waveguide unit,
    wherein the light guide plate unit includes a second light emission unit configured to transmit one beam of light split by the diffraction grating unit and emit the beam of the light in an external screen direction different from the viewpoint direction; and
    wherein the first light emission unit or the second light emission unit is provided with an optical shutter unit configured to switch transmission and blocking of light.

2. The image projection apparatus according to claim 1, wherein the viewpoint direction is substantially parallel to the external screen direction.

3. The image projection apparatus according to claim 1, wherein the first light emission unit or the second light emission unit is provided with a wavelength conversion unit configured to convert a wavelength of the first light.

4. The image projection apparatus according to claim 1, wherein the retroreflection unit is formed by mixing a specular reflection region in which light is specularly reflected and a retroreflection region in which light is retroreflected.

5. The image projection apparatus according to claim 1, wherein a partial reflection unit configured to reflect a part of the guided light and transmit a remaining part of the guided light is provided between the beam splitter and the retroreflection unit.

6. The image projection apparatus according to claim 1, further comprising:
    a second image irradiation unit configured to irradiate the diffraction grating unit with second light,
    wherein incident angles of the first light and the second light with respect to the diffraction grating unit are different from each other, and
    wherein the optical waveguide unit guides a part of the second light as guided light while totally reflecting the part of the second light.

7. The image projection apparatus according to claim 6, wherein a selective reflection unit configured to reflect a wavelength of the first light and transmit a wavelength of the second light is provided between the beam splitter and the retroreflection unit.

8. The image projection apparatus according to claim 6, wherein a second light emission unit is provided with an optical filter configured to selectively block the wavelength of the first light or the wavelength of the second light.

9. The image projection apparatus according to claim 1, further comprising:
    two light guide plate units,
    wherein one diffraction grating unit is provided in common to the first light incidence units of the light guide plate units.

10. The image projection apparatus according to claim 1, wherein the optical waveguide unit has a curved shape.

11. The image projection apparatus according to claim 1, wherein the first image irradiation unit includes a liquid crystal display element or a digital mirror device, and changes a content of a first image included in the first light over time.

12. The image projection apparatus according to claim 1, wherein the diffraction grating unit includes a flat-plate portion constituting a light incident surface and an uneven portion integrally formed with the flat-plate portion, and is formed separately from the light guide plate unit.

13. The image projection apparatus according to claim 1, wherein the diffraction grating unit has a holographic grating that diffracts light in at least two directions.

14. An image projection apparatus comprising:
a third image irradiation unit configured to emit first light;
a fourth image irradiation unit configured to emit second light;
a light guide plate unit including:
  a third light incidence unit on which the first light and the second light are incident,
  an optical waveguide unit configured to guide a part of the first light and a part of the second light as first guided light and second guided light, respectively, and
  a third light emission unit configured to emit the first guided light and the second guided light; and
a first diffraction grating unit provided in the third light incidence unit,
wherein incident angles of the first light and the second light with respect to the first diffraction grating unit are different from each other,
wherein a part of the first light and a part of the second light diffracted by the first diffraction grating unit satisfy a total reflection condition of the optical waveguide unit,
wherein the light guide plate unit includes a fourth light emission unit configured to transmit one beam of light split by the first diffraction grating unit and emit the beam of the light in an external screen direction, and
wherein the third light emission unit emits the first guided light and the second guided light in the external screen direction.

15. The image projection apparatus according to claim 14, wherein the first guided light and the second guided light are substantially the same in an incident position on the third light incidence unit, a reflection position on the optical waveguide unit, and an emission position on the third light emission unit.

16. The image projection apparatus according to claim 14, further comprising:
a digital mirror device having a plurality of minute mirrors controlled based on image information, wherein the first guided light and the second guided light emitted from the third light emission unit are reflected in a viewpoint direction via the digital mirror device.

17. The image projection apparatus according to claim 14, further comprising:
a second diffraction grating unit provided in the third light emission unit,
wherein the second diffraction grating unit diffracts a part of the first guided light and a part of the second guided light, and emits the part of the first guided light and the part of the second guided light in a viewpoint direction at different emission angles as first emitted diffracted light and second emitted diffracted light.

18. The image projection apparatus according to claim 17, wherein the first diffraction grating unit and the second diffraction grating unit are arranged in parallel or orthogonal to each other.

19. The image projection apparatus according to claim 14, further comprising:
two light guide plate units, wherein one first diffraction grating unit is provided in common to the third light incidence units of the light guide plate units.

20. The image projection apparatus according to claim 14, wherein the first diffraction grating unit includes a flat-plate portion constituting a light incident surface and an uneven portion integrally formed with the flat-plate portion, and is formed separately from the light guide plate unit.

21. The image projection apparatus according to claim 14, wherein the first diffraction grating unit constitutes a wavelength conversion element.

* * * * *